(12) United States Patent
Beyder et al.

(10) Patent No.: US 7,340,944 B2
(45) Date of Patent: Mar. 11, 2008

(54) OSCILLATOR AND METHOD OF MAKING FOR ATOMIC FORCE MICROSCOPE AND OTHER APPLICATIONS

(76) Inventors: Arthur Beyder, 94 Keller Ave., Kenmore, NY (US) 14217; Frederick Sachs, 196 Linwood Ave., Apt. 1, Buffalo, NY (US) 14209

( * ) Notice: Subject to any disclaimer, the term of this patent is extended or adjusted under 35 U.S.C. 154(b) by 0 days.

(21) Appl. No.: 11/506,970

(22) Filed: Aug. 18, 2006

(65) Prior Publication Data

US 2007/0044545 A1    Mar. 1, 2007

Related U.S. Application Data

(60) Provisional application No. 60/709,930, filed on Aug. 19, 2005.

(51) Int. Cl.
*G01B 5/28* (2006.01)
(52) U.S. Cl. ......................................................... 73/105
(58) Field of Classification Search ..................... None
See application file for complete search history.

(56) References Cited

U.S. PATENT DOCUMENTS

| | | | |
|---|---|---|---|
| 5,386,110 A | | 1/1995 | Toda |
| 5,515,719 A | | 5/1996 | Lindsay |
| 5,753,911 A | * | 5/1998 | Yasuda et al. ............... 250/306 |
| 5,874,668 A | | 2/1999 | Xu et al. |
| 6,016,693 A | | 1/2000 | Viani et al. |
| 6,066,265 A | | 5/2000 | Galvin et al. |
| 6,100,524 A | * | 8/2000 | Yagi et al. .................... 250/306 |
| 6,291,140 B1 | | 9/2001 | Andreoli et al. |
| 6,545,492 B1 | | 4/2003 | Altmann et al. |
| 6,583,411 B1 | | 6/2003 | Altmann et al. |
| 6,690,008 B2 | | 2/2004 | Hantschel et al. |
| 6,734,598 B2 | | 5/2004 | Shibaike et al. |
| 6,819,822 B2 | | 11/2004 | Behin et al. |
| 6,864,481 B2 | | 3/2005 | Kaito et al. |
| 6,867,443 B2 | | 3/2005 | Liu et al. |
| 7,054,257 B2 | * | 5/2006 | Binnig et al. ................ 369/126 |
| 7,089,787 B2 | | 8/2006 | Sahin et al. |
| 2001/0049959 A1 | | 12/2001 | Neukermans et al. |

(Continued)

OTHER PUBLICATIONS

F. Sachs, "Hinged Atomic Force Microscopy Cantilevers," CNF Project 883-00, Mechanical Devices, National Nanofabrication Users Network, 2003, pp. 174-175.

(Continued)

*Primary Examiner*—Robert Raevis
(74) *Attorney, Agent, or Firm*—James C. Simmons

(57) ABSTRACT

A device having an oscillator such as a sensor for use in an atomic force microscope. A pair of co-axial members interconnect support structure and the oscillator for torsionally suspending the oscillator. The co-axial members are portions of a layer of silicon nitride or other material that is connected to the oscillator and support structure, which are composed of silicon or other material.

A process for making a device which includes an oscillator, which includes depositing on silicon or other first material a layer of silicon nitride or other second material, forming in the first material a support structure and the oscillator, including applying an etchant which is selective for the first material to etch all the way through the first material and leave the second material substantially unetched to thereby form the at least one flexible hinge of the second material.

18 Claims, 15 Drawing Sheets

U.S. PATENT DOCUMENTS

| | | | |
|---|---|---|---|
| 2003/0016428 A1* | 1/2003 | Kato et al. | 359/226 |
| 2003/0167830 A1* | 9/2003 | Buguin et al. | 73/105 |
| 2003/0211424 A1* | 11/2003 | Werner et al. | 430/311 |
| 2006/0005614 A1 | 1/2006 | Sahin et al. | |
| 2007/0012094 A1* | 1/2007 | Degertekin et al. | 73/105 |
| 2007/0062265 A1 | 3/2007 | Beyder et al. | |

OTHER PUBLICATIONS

F. Sachs, "Hinged Atomic Force Microscopy (AFM) Cantilevers," Project 591-96, Biology and Chemistry, National Nanofabrication Users Network, 2001, pp. 16-17.

F. Sachs, "Torsional AFM levers for Sensitive Measurements in Liquid," CNF Proj. 883-00, Mechanical Devices, National Nanotechnology Infrastructure Network, 2005, pp. 170-171.

M. Gustafsson et al, "Scanning Force Microscope Springs Optimized for Optical-beam Deflection and with Tips Made by Controlled Fracture," J. Appl. Phys., 1994, 172-181, v. 76.

S. Miller et al, "Microelectromechanical Scanning Probe Instruments for Array Architectures," Rev. Sci. Instrum., 1997, pp. 4155-4161, v. 68.

I. Zubel, "The Influence of Atomic Configuration of (h k l) Planes on Adsorption Processes Associated with Anisotropic Etching of Silicon," Sensors and Actuators A, 2001, pp. 76-86, v. 94.

M. Viani et al, "Small Cantilevers for Force Spectroscopy of Single Molecules," J. Appl. Phys., 1999, pp. 2258-2262, v. 86.

Y. Xu et al, "Integrated Micro-scanning Tunneling Microscope," Appl. Phys. Lett., 1995, pp. 2305-2307, v. 67.

S. Miller, "Micromechanical Cantilevers and Scanning probe Microscopes," in Microlithography and Metrology in Micromachining, 1995, 45-52, M. Postek, Ed., Proc. SPIE 2640.

S. Altmann et al, "Multiple Sensor Stabilization System for Local Prove Microscopes," Rev. Sci. Instrum., 2001, pp. 142-149, vol. 72.

W. Chien et al, "On the Miller-indices Determination of Si 100 Convex Corner Undercut Planes," J. Micromech. Microeng., 2005, pp. 833-842, vol. 15.

X. Wu et al, "Compensating Corner Undercutting in Anistropic Etching of (100) Silicon," Sensors and Actuators, 1989, pp. 207-215, vol. 18.

P. Chang et al. "A Method Using V-grooves to Monitor the Thickness of Silicon Membrane with um Resolution," J. Micromech. Microeng., 1998, pp. 182-187, vol. 8.

A. Boisen et al, "AFM probes with Directly Fabricated Tips," J. Micromech. Microeng., 1996, pp. 58-62, vol. 6.

T. Albrecht et al, "Microfabrication of Cantilever Styli for the Atomic Force Microscope," J. Vac. Sci. Technol. A, 1990, pp. 3386-3396, vol. 8.

J. Brugger et al, "Silicon Cantilevers and Tips for Scanning Force Microscopy," Sensors and Actuators A, 1992, pp. 193-200, vol. 34.

J. Itoh et al, "Fabrication of an Ultrasharp and High-aspect-ratio Microprobe with a Silicon-on-insulator Wafer for Scanning Force Microscopy," J. Vac. Sci. Technol. B, 1995, pp. 331-334, vol. 13.

R. Marcus et al, "The Oxidation of Shaped Silicon Surfaces," J. Electrochem. Soc., 1982, pp. 1278-1282, vol. 129.

R. Marcus et al, "Formation of Silicon Tips with <1 nm Radius," Appl. Phys. Lett., 1990, pp. 236-238, vol. 56.

F. Laermer et al, "Challenges, Developments and Application of Silicon Deep Reactive Ion Etching," Microelectronic Engr., 2003, pp. 349-355, vol. 67-68.

W. Han et al, "A Magnetically Driven Oscillating Probe Microscope for Operation in Liquids," Appl. Phys. Lett., 1996, pp. 4111-4113, vol. 69.

A. Folch et al, "Microfabrication of Oxidation-Sharpened Silicon Tips on Silicon Nitride Cantilevers for Atomic Force Microscopy," J. Microelectromech. Sys., 1997, pp. 303-306, vol. 6.

* cited by examiner

OSCILLATOR AND METHOD OF MAKING FOR ATOMIC FORCE MICROSCOPE AND OTHER APPLICATIONS

The priority of U.S. provisional patent application Ser. No. 60/709,930, filed Aug. 19, 2005, the disclosure of which is hereby incorporated herein by reference, is hereby claimed.

The present invention relates generally to the investigation, measurement, manipulation, or otherwise sensing of the topographic features of a surface or object, particularly at the microscopic or atomic level, and includes devices having oscillators for other purposes. An example of an application of the present invention is a sensor for an atomic force microscope (which is also referred to herein as "AFM").

An atomic force microscope usually utilizes a sharp stylus or tip which is caused to move over the surface or object under investigation or otherwise detect the surface or object to, for example, map the physical contour and/or the softness or hardness spectrum (derived from energy level) over the surface. It can even manipulate samples such as the cutting of a chromosome (by increasing the force on the sample and using a very sharp tip and very stiff cantilevered member supporting the tip). The stylus or tip is supported by a stiff beam or pad (or is integrally part of the beam) which is compliantly supported by a hinge attached to a support structure so that it acts (moves) as a spring. Thus, the orientation or deflection of the cantilevered beam or pad changes in relation to topographic changes in the surface or object under investigation as it is moved over the surface or object. The beam deflection is monitored typically by a laser beam reflected off the pad onto a position sensitive photo-detector, as more particularly described hereinafter with reference to FIG. 2. Thus, the atomic force microscope may be said to be more akin functionally to a record player reading the topography of a record than to the traditional notion of a "microscope." The atomic force microscope belongs to the family of microscopes known as scanning probe microscopes. For example, the scanning tunneling microscope has a conductive tip for sensing electrical properties.

Tip properties define minimal resolution of surface topography. Physically, the cantilevered beam may be considered to be an oscillator. Since thermal noise is inherent in mechanical systems, the force or displacement resolution of the cantilevered beam is limited by its movement due to thermal noise. Soft cantilevered beams (those whose hinge or hinges are more compliant) are required to measure small forces.

The AFM is of particular importance in the field of biology since it is one of the few instruments than can be operated to measure mechanical properties in salt water, life's preferred medium, as well as other fluids, and can be used for measurements on live samples under water. Moreover, the AFM can be used in liquid for scanning at atomic resolution, and it allows measurements of forces in the regimes of significance such as single molecule force spectroscopy.

In liquid, the cantilever response is hindered due to viscous drag and coupled liquid mass, which results in a smaller operational speed limit and decreases force resolution. A "cantilever" is defined herein as including the tip or other substrate engagement means and a hinge or hinges cantileverly connecting the tip or other substrate engagement means to a support structure (chip) and further includes any beam or pad to which the tip may be attached, integrally or otherwise. Since the impact of drag on an object moving in fluid is a function of the object's speed and size, the cantilever size should be minimized. Thus, AFM cantilevers for operation in salt water (or for other sensitive operation outside vacuum) should be small in size.

The first cantilevers had beams made from a gold foil with an attached small diamond tip. Later, silicon micromachining technology was used to make cantilevers in parallel production with well-defined mechanical properties. Presently, AFM cantilevers are made from a variety of materials, the more common of which are silicon (Si), stoichiometric silicon nitride ($Si_3N_4$), low stress silicon-rich silicon nitride (SiN), and silicon dioxide ($SiO_2$).

A typical cantilever having a tip and a hinge (microcantilever spring) connecting the tip to a support chip is illustrated in FIG. 1 of Gustaffsson et al, "Scanning Force Microscope Springs Optimized for Optical-beam Deflection and with Tips Made by Controlled Fracture," *J. Appl. Phys.*, vol. 76(1), 1994, pp 172-181. Since the spring curvature thereof can distort the measurements, the tip is typically located on a more rigid beam or pad from which the laser beam is deflected, such as illustrated in FIG. 3 thereof.

Silicon cantilevers have typically had hinges which are generally thick (greater than 1 micron) and therefore not very soft (compliant).

Soft cantilevers (having soft or very compliant hinges) have usually been made from silicon nitride, because low-stress highly uniform films of $Si_3N_4$ can be grown very thin (less than 1 micron). Such soft cantilevers are large (having hinges on the order of hundreds of microns long) and hence have low resonant frequencies, particularly in liquids. The mechanical compliance for cantilever hinges is a cubic function of the length and an inverse of the cubed thickness thereof. Thus, soft cantilevers can be made by elongation or thinning. Typically, highly compliant cantilevers are made long (the hinges being on the order of 300 microns long). Such cantilevers with long hinges have large surface areas and are highly damped in liquid.

To increase reflectivity, cantilever beams or pads have often been coated with a thin layer (40 to 50 nanometers) of aluminum or gold.

It is desirable to provide cantilevers of smallest possible dimensions (desirably on the order of the diameter of the measuring laser beam, for example, about 20 microns) so that their optical gain and the frequency response of the probes are maximized.

Silicon nitride cantilevers have been built with hinges as thin as 86 nanometers and as short as 27 microns. They have shown the promise of allowing fast and quiet AFM imaging. However, there are some drawbacks to such small cantilevers. Due to their small size, there is a limited area of access to the sample (surface under investigation) and to the pad for receiving the optical (laser) beam. Therefore, AFMs that use such small cantilevers undesirably require specialized optics and cannot therefore be integrated into off-the-shelf AFMs. Also, when a small cantilever hinge bends, it undesirably attains higher curvature than a longer cantilever hinge with the same spring constant (as in the case of a bendable mirror). Additionally, due to the asymmetry of such typical thin-hinged cantilevers, their hinges often undesirably curl during the production process as a response to intrinsic film stress and thermal stress.

For scanning or sensing soft samples, it is considered desirable to use cantilevers with soft (compliant) hinges since they minimize sample perturbation and maximize sensitivity. It is also considered desirable that the cantilevered member which supports the tip as well as the support structure be of adequate stiffness so that the entire cantilever does not undesirably flex.

Cantilevers with thin and therefore soft hinges are difficult to make from silicon unless expensive E-beam lithography is used, since it is difficult to precisely control the silicon etch process to leave a sufficiently thin layer.

In a Cornell Nanoscale Facility internet publication (National Nanofabrication Users Network) entitled "Hinged Atomic Force Microscopy Cantilevers" (CNF project 883-00), Mechanical Devices, pp 174-175, published on the internet in 2003, Applicants discussed a fabrication process for their hinged cantilever (shown in FIG. 3 thereof as having a beam, support structure, and a thin hinge connecting the beam and support structure). In that publication it is disclosed that the "fabrication process involves three main steps: 1) backside die etch; 2) direct tip fabrication; and 3) lever and hinge fabrication. Dies are designed to be supported by one edge, defined on the backside by a self-terminated KOH etch. We use 'dog-ears' for compensation of exposed corners during the backside KOH etch. On the topside, we can fabricate the tip directly, either by KOH or SF6 liftoff. The tip can be oxidation-sharpened if an atomically-sharp tip is desired. Silicon nitride hinges can survive multilevel processing because they are protected on both sides by silicon oxide until the very last release step." It is also disclosed that "dual-hinge & torsion levers can be fabricated using this process with modification only at the CAD level." The hinges are disclosed as being made of silicon nitride, and backside KOH is disclosed for fabrication of dies and thin silicon membranes. See also an earlier similar publication published on the internet in 2001 by the Applicants entitled "Hinged Atomic Force Microscopy (AFM) Cantilevers" (Project 591-96), Biology & Chemistry, pp 16-17, wherein it is disclosed that the stiff back-beam of the cantilever is made of silicon and that the hinge region is a thin silicon nitride film. Applicants also published a similar publication on the internet in 2005 entitled "Torsional AFM levers for Sensitive measurements in Liquid," (Project 883-00), Mechanical Devices, pp 170-171. These publications do not disclose all the steps of the process referred to therein, and they certainly do not disclose the process or cantilever adequately to enable one of ordinary skill in the art to make the cantilever.

As previously discussed, for biological applications, it is important that a cantilever function well in liquids such as salt water. Undesirably, the heretofore described hinged asymmetric cantilever (such as shown in the previously cited Gustaffsson et al article as well as in the previously cited Cornell publications) warps when it becomes hydrated in a liquid and also warps with temperature or contamination or other environmental perturbations. Moreover, while such a hinged cantilever provides compliance and sensitivity vertically (called herein the "z axis," which is normal to the hinge), it has little or no compliance or sensitivity laterally (called herein the "x axis") of the hinge.

It has been suggested that the member or beam supporting the tip be connected to the support structure through a pair of flexible members acting as torsion springs, about which the beam can rotate. It is further suggested that such a torsion cantilever be made from amorphous silicon nitride, and it is implied that single-crystal silicon could alternatively be used. See FIG. 6d of the previously cited Gustaffsson et al article. Also see Miller et al, "Microelectromechanical Scanning Probe Instruments for Array Architectures," Rev. Sci. Instrum., vol. 68(11), 1997, pp 4155-4162; and Miller et al, "Proc. SPIE, 2640, 45, 1995. As previously discussed, it is difficult to make such cantilevers out of silicon or silicon nitride so that the torsion springs are thin enough unless expensive E-beam lithography is used.

What is measured by an AFM is traditionally the force on the tip of the compliant cantilever. Since the AFM instrument is in the dimensional range of 10 cm. or greater, extraneous movements will undesirably deflect the tip while it is otherwise being deflected by the sample. Also, environmental vibrations and the like can shake (deflect) the cantilever relative to the object being investigated. Such unwanted deflections create low frequency noise. It is considered desirable to remove such unwanted noise in order to increase measurement accuracy and precision while providing the ability to conduct longer experiments. Its removal also reduces demands on microscope design since drift in the z axis is desirably reduced.

In order to remove such unwanted noise, it has been suggested to measure and subtract from the measured tip movements the substrate movements, utilizing two separate cantilever sensors sitting side-by-side (possibly on the same die) and each detected independently to split the tasks of substrate and sample position measurement. See Altmann et al, "Multiple Sensor Stabilization System for Local Probe Microscopes," Rev. Sci. Instrum., vol. 72, 2001, pp 142-149; and U.S. Pat. Nos. 6,545,492; 6,798,226; and 6,583,411. Other patents which may be of interest in this regard are U.S. Pat. Nos. 5,515,719 and 6,819,822.

The above system of Altmann et al requires dual laser beams for the independent detection of the sensors. Alignment thereof undesirably is tedious and difficult, and such a system also undesirably requires a specialized microscope.

Other patent references which may be of interest to the present invention are U.S. Pat. Nos. 5,386,110; 5,874,668; 6,016,693; 6,066,265; 6,291,140; 6,690,008; 6,734,598; 6,864,481; and 6,867,443 and U.S. patent application publications 2001/0049959 and 2006/0005614. These patent references and other patent references discussed herein are incorporated herein by reference.

It is accordingly an object of the present invention to provide an improved torsion cantilever wherein the properties of the cantilevered member and support structure and of the torsion bars may be tailored to their respective specific requirements.

It is a further object of the present invention to provide a torsion cantilever wherein the cantilevered member and support structure are of adequate stiffness so that the entire cantilever does not undesirably flex while the torsion bars or hinges have the flexibility or softness of the desired sensitivity.

It is yet another object of the present invention to provide a method of mass production of micro-mechanical oscillators with flexible hinges with a wide variety of geometries and mechanical properties (sizes, spring constants, etc.), including custom shapes and modes of motion, on a single die.

It is a further object of the present invention to use standard micro-fabrication equipment, without involvement of advanced techniques such as E-beam lithography, for such a mass production method.

It is another object of the present invention to use inexpensive silicon wafers (not, for example, more expensive SOI wafers) for such a fabrication process.

In order to provide an improved torsion cantilever wherein the torsion bars may be made thin enough to provide the desired compliance (softness) but without expensive E-beam lithography, in accordance with the present invention, torsion members are part of a layer of silicon nitride or other suitable material which is applied to the cantilevered beam and support structure made of silicon or other suitable different material.

In order to mass produce composite material micromechanical oscillators with torsion bars or other flexible hinges with a wide variety of geometries and mechanical properties (sizes, spring constants, etc.), including custom shapes and modes of motion, on a single inexpensive wafer using standard micro-fabrication equipment, in accordance with the present invention, a layer of a second material is deposited on a wafer composed of a first material, and the support structure and the oscillator are formed in the wafer, including applying an etchant which is selective for the first material to etch all the way through the first material and leave the second material substantially unetched to thereby form the at least one flexible hinge of the second material. The oscillators are made to be easily removed from the silicon wafer, to be supported on a large silicon die which can be used for manipulation, are made of three standard micro-fabrication materials (silicon nitride, silicon dioxide, and silicon), and are provided to have very thin flexible hinges and thicker very stiff silicon support structures and cantilevered members.

The above and other objects, features, and advantages of the present invention will be apparent in the following detailed description of the preferred embodiment(s) thereof when read in conjunction with the appended drawings in which the same reference numerals denote the same or similar parts throughout the several views.

DETAILED DESCRIPTION OF THE PREFERRED EMBODIMENTS

Figure 2:
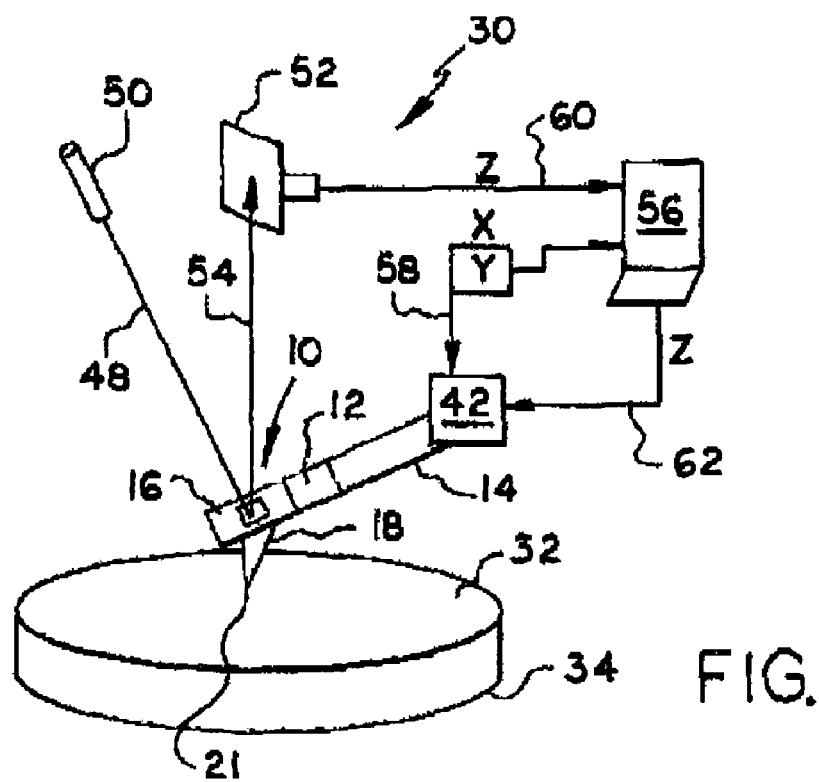
FIG. 2 schematic view of an atomic force microscope (AFM) which employs the sensor.

Referring to FIG. 2 of the appended drawings, there is illustrated generally at 30 an atomic force microscope (AFM) for use in sensing and measuring or otherwise investigating the three-dimensional topology or surface properties such as contour of the surface 32 of an object or sample 34, for example, cells or other biological material. The AFM 30 includes a sensor 10 having a cantilevered member 16 to which a pointed or sharp tip or stylus 18 is integrally or otherwise suitably mounted, wherein the tip 18 is movable over the surface 32 (or otherwise detects the surface or object such as a molecule) causing the cantilevered member 16 to cant as the contour of the surface 32 changes, thus sensing changes in surface contour or otherwise sensing the surface or object. With reference to sensing, the term "surface," as used herein and in the claims, is meant to include objects such as cells under investigation. The cantilevered member 16 and tip 18 define a probe. It should however be understood that, while the usual applications will utilize a tip, the present invention does not require that the probe have a tip. A thin compliant hinge 12 connects the cantilevered member 16 to support structure or handle chip 14.

Figure 1:
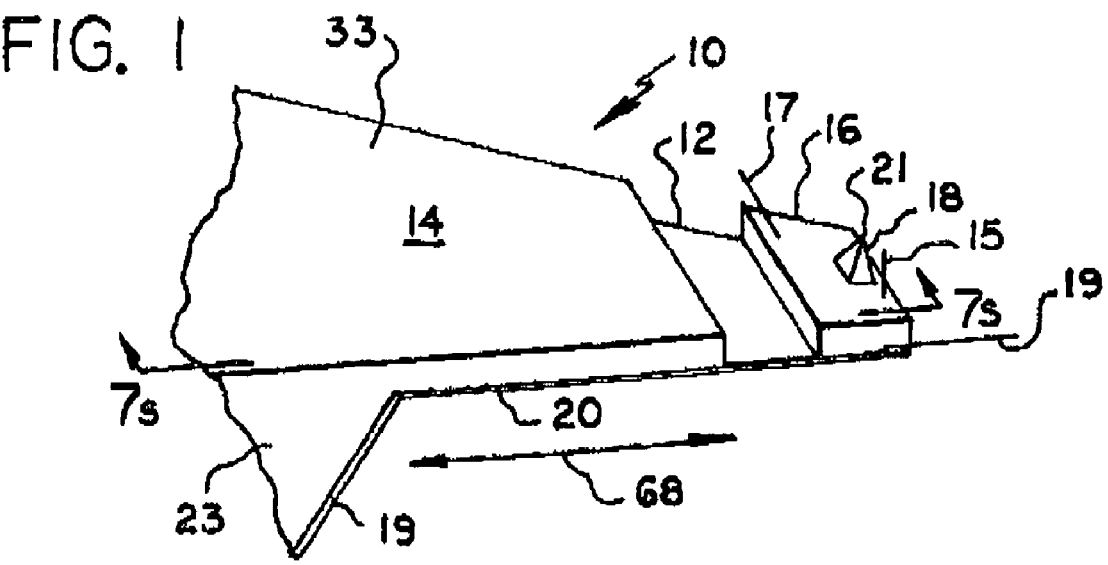
FIG. 1 is a perspective schematic view of a handle chip (in partial view) containing a hinged sensor made in accordance with the process of the present invention.
Figure 9:
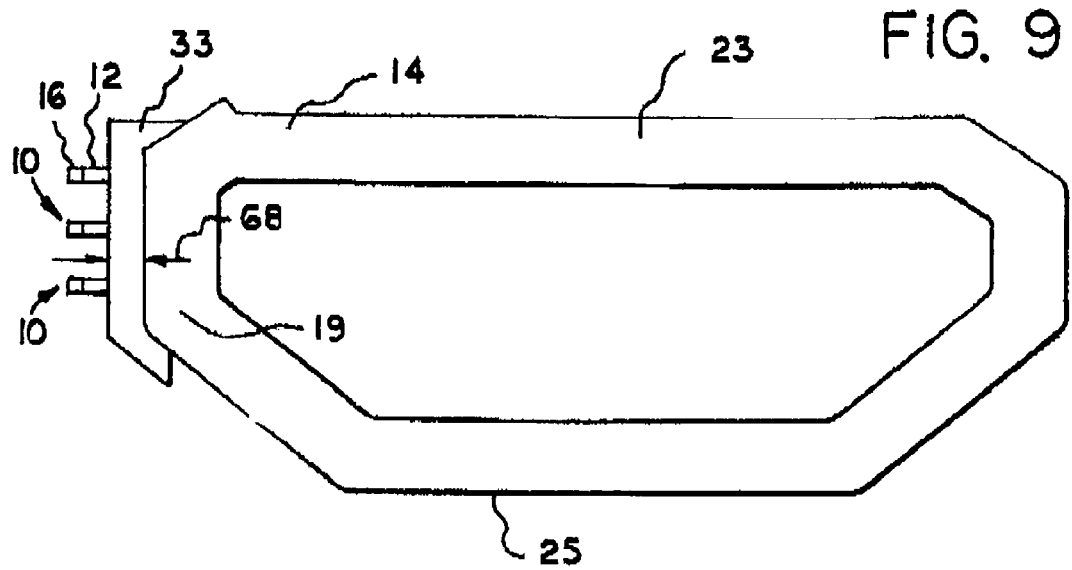
FIG. 9 is a schematic bottomside view of the handle chip of FIG. 1.

As seen in FIG. 9 as well as FIG. 1, the bottomside (side opposite the tip) of support structure 14 has a thin portion 33 extending over a distance, illustrated at 68, from the hinge 12, and the support structure 14 is thereafter sloped, as illustrated at 19, to define a much thicker portion or handle 23 for supporting operational devices for moving and monitoring the sensor 10. The operational devices are supported and used in accordance with principles commonly known to those of ordinary skill in the art to which this invention pertains. The handle chip 14 may contain a plurality (3 shown) of sensors 10 extending from the front end thereof. The plurality of sensors 10 may be redundant or may be in a variety of types/sizes for a variety of tasks. The set back 68, which, for example, may be about 150 microns, and the slanting 19 (which is achieved by suitable etching which also provides the hereinafter described pre-etching at 25) are provided to keep the chip 14 and its shadow from interfering with the laser beam 48 (described hereinafter). For example, the handle portion 23 may have a thickness in the neighborhood of 400 to 450 microns (the typical thickness of a wafer from which the sensor is made) and a width and length of several millimeters each. An array of handle chips 14 each containing a plurality of sensors 10 may be formed in a wafer, illustrated at 27 in FIG. 11 (the scale being too large in FIG. 11 for the sensors to be shown). The wafer is etched through along the ends and one side of the chip 14, as illustrated at 29, wherein the chip 14 is connected to the wafer only along one edge 25. Attachment edge 25 is desirably pre-etched to allow the chip 14 to be easily broken away from the wafer for use. Accordingly, the thickness of the handle chip 14 (except for the thinner portions 33) is generally equal to the thickness of the wafer from which it is made. It should of course be understood that the support structure 14 and cantilevered member 16 may be otherwise suitably sized and shaped as required or desired for each application, for example, as hereinafter described with respect to FIGS. 3 and 4.

As is well known in the art, a piezotranslator 42 positions the support structure 14 while the displacement or canting of the cantilevered member 16 is monitored by what may be called an "optical lever", i.e., a laser beam 48 provided by a suitable laser device 50 and reflected from the back or bottomside surface (the surface opposite the surface on which the tip 18 is located) on the cantilevered member 16 onto a positron sensitive photodetector 52, as illustrated at 54. Optic beams other than laser may be alternatively employed. The piezotranslator x and y positions and velocities and the z-position are controlled by a general purpose computer 56, as illustrated at 58 and 62 respectively, and may be modulated in feedback, as illustrated at 60 and at 58, 62 respectively. The x, y, and z axes are illustrated at 17, 19, and 15 respectively in FIGS. 1 and 3. The laser beam reflection 54 provides information about the canting of the cantilevered member 16 in response to the work performed by the surface 32 on the tip 18 being rastered beneath it. When operated in feedback, software feedback loop 60 controls the piezotranslator 42 to minimize the bending of the cantilevered member 16 to maintain a more controlled force on the surface 32. While a variety of operational modes of AFM exist, such as contact (repulsive), non-contact (attractive), and intermittent contact, they can be roughly divided into the categories of constant force and constant height. In the constant force mode, the support structure 14 is moved up and down to maintain a constant deflection (force) at the tip 18. In a constant height mode, the mean position of the support structure 14 is fixed, and the force field is sampled by the tip deflection. The above principles of the AFM are well known to those of ordinary skill in the art to which the present invention pertains. While the sensor of the present invention is described in connection with an AFM, it should be understood that it may have other suitable applications such as, for example, other types of scanning probe microscopes.

Referring again to FIG. 1, the pad 16 may be sized to accept the typical (20 micron diameter) optical beam waist of commercial AFMs. Minimization is limited only by the optical resolution of contact photolithography, i.e., about 0.5 micron. An additional factor in determining pad length is the optical gain, i.e., shorter pads have higher gains. Thus, shorter probes may be made stiffer and still retain high sensitivity. Accordingly, the cantilevered member 16 may have a length and width in the neighborhood of, for example, 10 to 30 microns each. The cantilevered member 16 may be otherwise suitably sized and shaped and of course made smaller. The pyramidal or conical tip 18, whose sharp point 21 engages the surface 32, is preferably integral to the cantilevered member 16 (for ease of manufacture in accordance with the process described hereinafter) but may be otherwise suitably attached.

In accordance with the hereinafter described process of the present invention, the thin compliant hinge 12 is a part or portion of a thin layer or coating 20 of material which substantially spans (but need not span entirely) the length and width of the sensor 10, i.e., it is applied (attached) to the back or bottom sides (opposite the side on which the tip is located) of the cantilevered beam 16 and support structure 14, and the layer portion 12 extends therebetween to define the compliant hinge.

In order to more easily and inexpensively make the sensor, including control of hinge thickness, as discussed more fully hereinafter with respect to FIGS. 7a to 7s, the hinge material is different from the material of which the member 16 and tip 18 and structure 14 are made. The member 16 and tip 18 and the supporting structure 14 are made of silicon or other suitable material of a thickness selected to be sufficient to provide the desired stiffness, while the hinge material is LPCVD (low pressure chemical vapor deposition) silicon nitride or other suitable material, such as, for example, polyimide, gold, SU8 (which is a photolithographic plastic), or other suitable plastic, whose thickness is selected to be sufficiently thin to provide the desired compliancy (softness). Preferably, the thickness of the cantilevered member 16 as well as the support structure 14 are the least that is suitably functional and has sufficient rigidity. In order to have sufficient rigidity, the thickness of each of the silicon cantilevered member 16 and silicon support structure portion 33 is at least about 1 micron, for example, the member 16 and thin support portion 33 may have a thickness of about 5 microns (and of course may be different if made of other materials). In order for the hinge 12 to be sufficiently compliant, the silicon nitride layer 20 of material and thus the hinge 12 preferably has a thickness less than about 100 nanometers, for example, about 20 to 50 nanometers (and of course may be different if made of other materials). Thus, the cantilevered member 16 and support structure portion 33 are on the order of 100 times thicker than the hinge 12 so as to achieve the desired compliancy for the hinge 12 while providing the desired stiffness to the rest of the cantilever.

Figure 3:
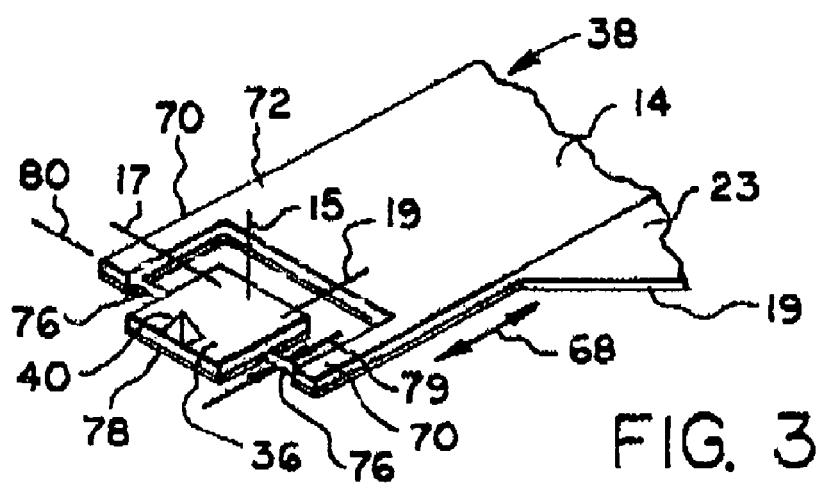
FIG. 3 is a perspective schematic view of a handle chip (in partial view) containing a sensor which embodies the present invention.
Figure 4:
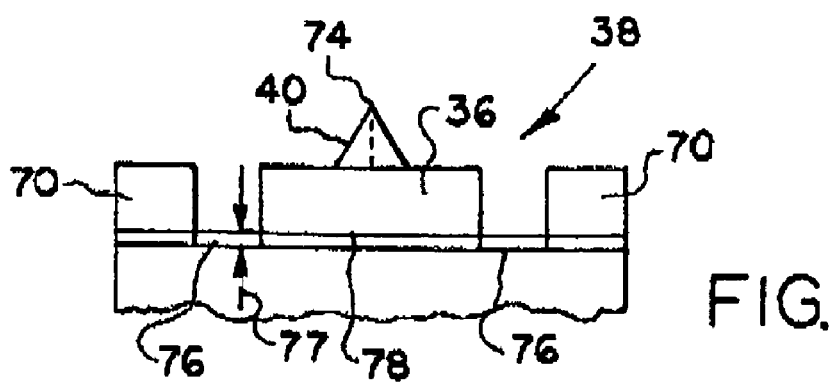
FIG. 4 is a front view thereof.

Referring to FIGS. 3 and 4, there is shown generally at 38 an alternative embodiment of a sensor, which is attached to a handle chip 14 similarly as described for sensor 10. A thin support portion 72, similar to support portion 33, has a pair of spaced parallel arms 70 protruding from its front end, with the set-back 68 defined rearwardly from the arms 70. Each of the arms 70 has a length and width of, for example, about 150 and 10 microns respectively. A cantilevered beam 36, similar to beam 16, is attached between the arms 70 by hinge members 76, which are described in greater detail hereinafter. It should be understood that, in accordance with the present invention, the cantilevered beam 36 (or any other of the cantilevered beams disclosed herein) need not be part of a sensor. For example, it may be an oscillator for an accelerometer.

The pad 36 may be sized to accept the typical (20 micron diameter) optical beam waist of commercial AFMs. Minimization is limited only by the optical resolution of contact photolithography, i.e., about 0.5 micron. An additional factor in determining pad length is the optical gain, i.e., shorter pads have higher gains. Thus, shorter probes may be made stiffer and still retain high sensitivity. Accordingly, the cantilevered member 36 may have a length and width in the neighborhood of, for example, 20 microns each. The cantilevered member 36 may be otherwise suitably sized and shaped and of course made smaller. The pyramidal or conical tip 40, whose sharp point 74 engages the surface 32, is preferably integral to the cantilevered member 36 (for ease of manufacture in accordance with the process described hereinafter) but may be otherwise suitably attached. As previously discussed, the present invention does not require that the probe, which includes the cantilevered member 36, include the tip 40.

As previously discussed, for biological applications as well as use in viscous environments, it is important that a cantilever function well in liquids such as salt water. Undesirably, the hinge 12 of the cantilever 10 of FIG. 1 warps when it becomes hydrated in a liquid and also warps with temperature or contamination or other environmental conditions. In order to prevent such warping, in accordance with the present invention, the cantilevered member 36 is disposed intermediate the two arms 70 (and is shown to jut out beyond the free ends thereof), and the hinges 76 are a pair of elongate or otherwise suitably shaped torsion bars or members which torsionally interconnect the cantilevered member 36 to the arms 70 respectively co-axially (as illustrated by the common longitudinal axis 80 of the torsion bars 76 which defines the torsion bars 76 as being co-axial) on opposite sides of the cantilevered member 36. Thus, the cantilevered member 36 is symmetrically and uniformly supported between the arms 70 for rotational movement about the axis 80. The term "torsion bar", as used herein and in the claims, is meant to refer to a member which is twistable about an axis to allow movement of another member to which it is connected about the axis. A hinge, for the purpose of this specification and the claims, is meant to include such a torsion bar. Such a symmetrical torsion bar arrangement is provided to allow symmetrical control of movement of the cantilevered member 36 wherein it is free to twist or rotate in opposite rotational directions about the torsion bar common axis 80 to allow the tip 40 to freely move upwardly and downwardly. Each torsion bar 76 may have a length of, for example, about 10 microns. Its cross-sectional shape is rectangular, but may be otherwise suitably shaped. By "cantilevered member," for the purposes of this specification and the claims, is meant a member which extends beyond its point(s) or means of support to act like a cantilever in supporting a tip or stylus or other surface engaging means for movement over a surface similarly as a stylus is supported in a record player.

In order to more easily and inexpensively make the sensor 38 (FIG. 3), including control of hinge thickness, as discussed more fully hereinafter with respect to FIGS. 7a to 7s, the hinge 76 material is different from the material of which the member 36 and tip 40 and structure 14 are made. The member 36 and tip 40 and the supporting structure 14 are made of silicon or other suitable material of a thickness selected to be sufficient to provide the desired stiffness, while the hinge material is LPCVD (low pressure chemical vapor deposition) silicon nitride or other suitable material, such as, for example, polyimide, gold, SU8, or plastic, whose thickness is selected to be sufficiently thin to provide the desired compliancy (softness). Preferably, the thickness of the cantilevered member 36 as well as the support structure portion 72 (including arms 70) is the smallest that is suitably functional and has sufficient rigidity. In order to have sufficient rigidity, the thickness of each of the silicon cantilevered member 36 and the silicon support structure portion 72 (including arms 70) is at least about 1 micron, for example, about 5 microns (and of course may be different if made of other materials). In order for each of the silicon nitride hinges 76 to be sufficiently compliant, its cross-sectional height, illustrated at 77, is less than 400 nanometers, preferably less than about 100 nanometers, for example, about 50 nanometers, to allow the probes to be softer than the softest presently available AFM cantilevers (about 0.01 N/m) and with resonances in water above 10 kHz (and of course may be different if made of other materials). Thus, cantilevered member 36 and support structure portion 72 are on the order of 100 times thicker than the thickness 77 of the torsion bars 76 so as to achieve the desired compliancy for the torsion bars 76 while providing the desired stiffness to the rest of the cantilever 38, and the hereinafter described cantilevers of FIGS. 5, 6, and 10 have similar thickness ratios. The torsion bar cross-sectional width, illustrated at 79, is preferably between about 2 and 5 microns in order to achieve the desired spring constant for the desired softness (compliancy), and hinge width scales linearly with the spring constant.

In accordance with the present invention, the compliant torsion bars 76 are parts or portions or extensions of a thin layer or coating 78 of material which substantially spans (but need not span entirely) the length and width of the sensor 38, i.e., it is applied (attached) to the back or bottom sides (opposite the side on which the tip is located) of the beam 36 and support structure 14 and extends therebetween to define the compliant torsion bars 76. The torsion bars 76 are formed in a fabrication process described hereinafter with respect to FIGS. 7a to 7s. The thickness of the thin layer 78 of material is accordingly the same as the height 77 of the torsion bars 76.

In order to make the outer surface of the portion of the layer 78 which covers the cantilevered member 36 (and similarly the outer surface of the portion of the layer 20 which covers member 16) suitably reflective for suitably reflecting the laser beam 48, it is coated with a suitably reflective material, preferably gold, but other suitable reflective materials therefor include, but are not limited to, aluminum and silicon. Because gold is much softer than silicon nitride (a preferred material of which the torsion bars is made, as previously described), it will desirably have a minimal effect on the spring constant.

Figure 5:
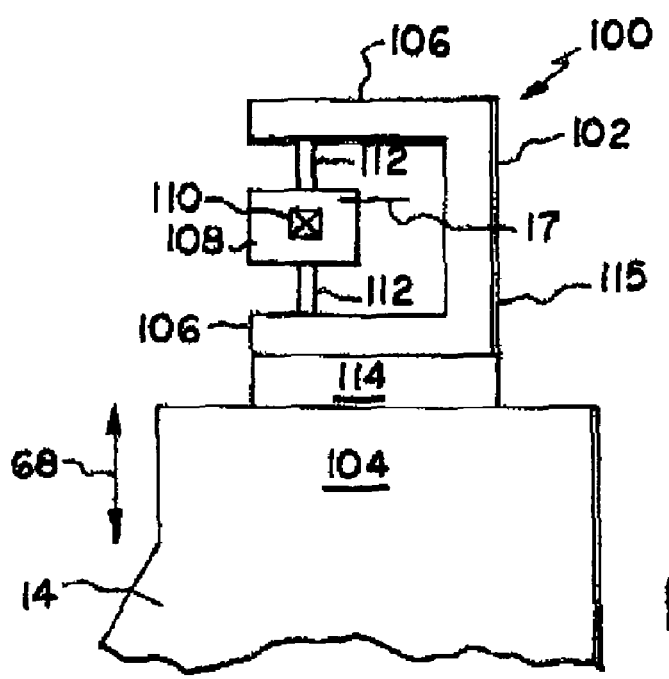
FIG. 5 is a schematic plan view of a sensor in accordance with an alternative embodiment of the present invention.

Referring to FIG. 5, there is illustrated at 100 a sensor in accordance with an alternative embodiment of the present invention. The sensor 100 includes a first stiff support structure 102 and a second stiff support structure 104. The second support structure, similar to support structure 33, is a thinned extension of a handle chip 14. The first support structure 102, which is similar to support structure 72, has a pair of interconnected arms 106, similar to arms 70, which straddle a stiff cantilevered member 108, similar to cantilevered member 36, supporting tip 110, similar to tip 40. Unlike the sensor 38 of FIGS. 3 and 4, the cantilevered member 108 and torsion bars 112 of sensor 100 are oriented laterally to the support structure 104, i.e., the arms 106 straddle the cantilevered member 108 along the forward and rear sides thereof (instead of along the lateral sides thereof). Moreover, the tip 110 could be located anywhere on the cantilevered member 108 depending on the desired sensitivity, for example, it is shown located generally centrally on the cantilevered member 108. The arms 106 are connected to the cantilevered member 106 by soft or flexible or compliant torsion bars 112 respectively, which are co-axial and otherwise similar to torsion bars 76 except that they are oriented to extend forwardly and rearwardly of the sensor 100 and are connected generally centrally of the cantilevered member 108.

A short compliant flexible thin hinge 114, similar to hinge 12, is provided to connect the first and second support structures 102 and 104 respectively. Unlike torsion bars, the flexible hinge 114 bends or flexes (does not twist, i.e., is not torsional) to allow movement of the first support structure 102 relative to the second support structure 104. Similarly as described for FIGS. 1, 3, and 4, the hinge 114 and torsion bars 112 are portions of a single layer, illustrated at 115, of material, similar to material layers 20 and 78, which covers and is attached to the bottomsides (but need not entirely cover) of the support structures 102 and 104 and cantilevered member 108, and the sensor 100 may be constructed similarly as described with reference to FIGS. 7a to 7s. Hinge 114 is provided for vertical sensitivity and compliance (z axis 15 sensitivity), i.e., for sensitivity and compliance in vertical force imaging as the tip 110 traverses a surface 32. Thus, hinge 114 allows flexing movement (which is not torsional movement) of the first support structure 102 relative to the second support structure 104. The torsion bars 112 are provided for lateral or twisting sensitivity and compliance (x axis 17 sensitivity), i.e., for sensitivity and compliance in lateral force imaging as the tip 110 traverses a surface 32. Thus, the sensor 100 of FIG. 5 is provided to desirably achieve enhanced lateral and vertical force imaging.

Figure 6:
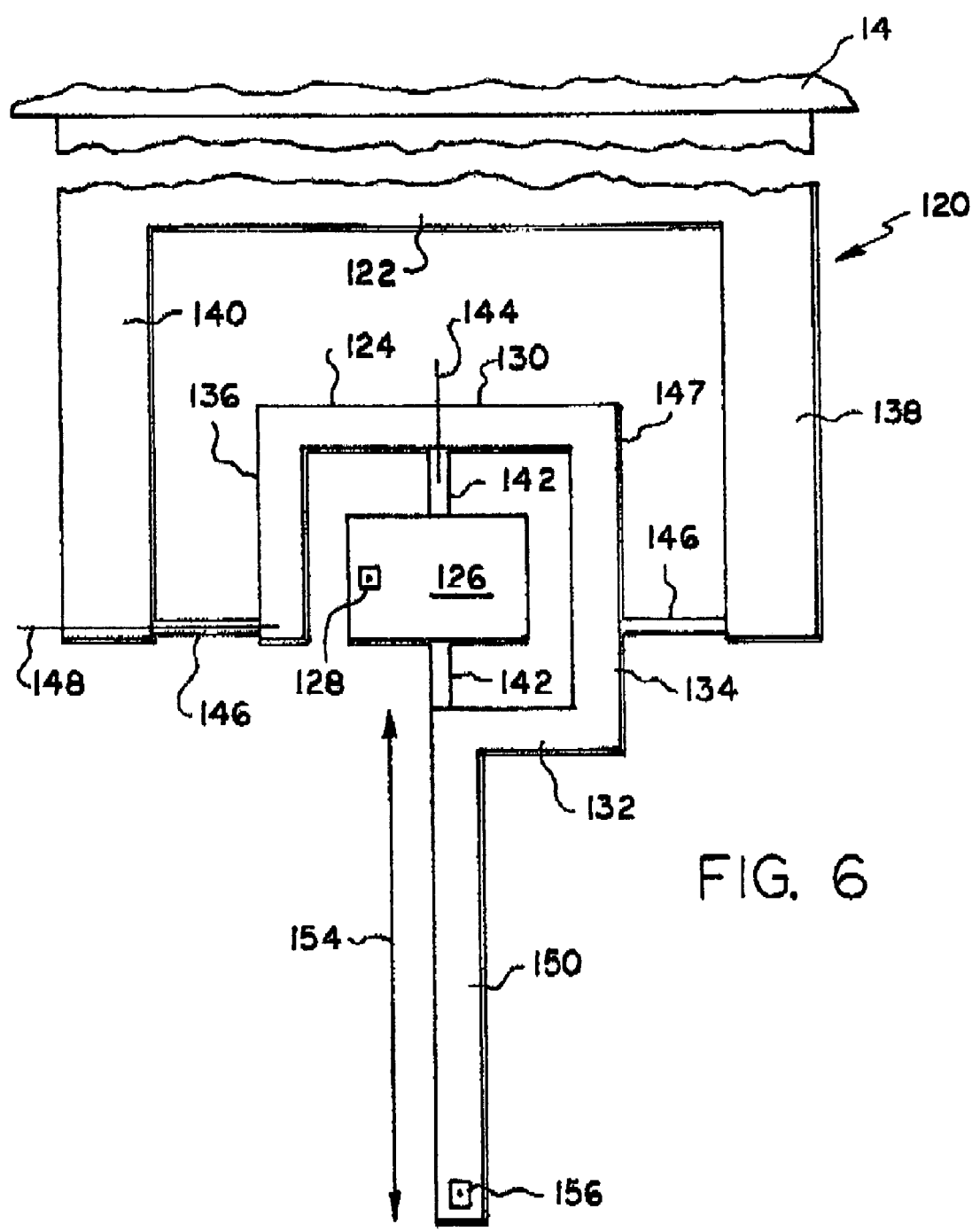
FIG. 6 is a schematic plan view of a sensor in accordance with another alternative embodiment of the present invention.

Referring to FIG. 6, there is illustrated at 120 a two-axis sensor (i.e., allowing rotational movement about two torsion bar axes) in accordance with another embodiment of the present invention. The sensor 120 includes first and second rigid support structures 122 and 124 and a rigid cantilevered member 126 having a tip 128, all similar to the corresponding support structures 72 and member 36 and tip 40 except as otherwise shown or hereinafter described. The first support structure 122, similar to support structure 33, is a thinned extension of a handle chip 14. The second support structure 124 is shaped to define a first pair of generally spaced parallel arms 130 and 132 which are connected at ends thereof by a second arm 134. The first arms 130 and 132 straddle the cantilevered member 126, and the first arm 130 extends beyond the cantilevered member 126 as well as beyond the end of the other first arm 132. Another second arm 136 extends from the other end of first arm 130 in a direction generally toward the longitudinal axis of the other first arm 132 and generally parallel to the other second arm 134. The first support structure has a pair of spaced generally parallel arms 138 and 140 which straddle the second support structure 124, its arms 138 and 140 extending generally parallel to arms 134 and 136. A first pair of flexible elongate torsion bars 142 co-axially (along longitudinally axis 144) connects (extending forwardly and rearwardly of the sensor) the cantilevered member 126 to the first arms 130 and 132. A second pair of flexible elongate torsion bars 146 co-axially (along longitudinally axis 148) connect (extending laterally of the sensor) the first support structure arms 138 and 140 to the second arms 134 and 136 respectively. The torsion bars 142 and 146 are similar to torsion bars 76. Similarly as described for FIGS. 3 and 4, the torsion bars 142 and 146 are portions of a single layer, illustrated at 147, of material, similar to material layer 78, which covers and is attached to the bottomsides (but need not entirely cover) of the support structures 122 and 124 and cantilevered member 126, and the sensor 120 may be constructed similarly as described with reference to FIGS. 7a to 7s.

An elongate arm 150 extends from the free end of arm 132 outwardly (forwardly) or away from cantilevered member 126 in the axial direction 144. A second tip 156, similar to tip 40, is disposed on the outer end portion of arm 150. Thus, the second tip 156, which is on the second support structure or outer gimbal 124, is disposed at some distance from the tip 128, which may be called the "sample tip." It should be noted that torsion bars 142 allow twisting movement of the cantilevered member or inner gimbal 126 about axis 144, that torsion bars 146 allow twisting movement of the second support structure or outer gimbal 124 (as well as inner gimbal 126) about axis 148, and that axes 144 and 148 are generally normal or orthogonal to each other. The support structures 122 and 124 as well as cantilevered member 126 may be, for example, 10 microns thick.

What is measured by an AFM is traditionally the force on the sample tip 128 of the compliant cantilever. Since the AFM is in the dimensional range on the order of 10 cm., any movement of any part of the AFM or stage will undesirably deflect the sample tip 128 while it is otherwise being deflected by the object's surface 32, and the tip 156 will similarly be deflected. Also, building vibrations and the like can shake (deflect) the cantilever relative to the object 34 being investigated. Such unwanted deflections create low frequency coherent noise (including noise caused by microscope drift and environmental noise). It is considered desirable that such unwanted coherent noise be removed to increase measurement accuracy and precision increase while providing the ability to conduct longer experiments. Its removal is also desired to remove drift in the z axis 15 direction as a significant factor and thereby reduce demands on microscope design. In order to remove such unwanted noise, in accordance with the present invention, the tip 156 is used as a reference tip. Since the two axes 144 and 148 are orthogonal, they encode the two positions independently from the same laser beam 48 whereby the need for two separate lasers is eliminated. Twisting movement about axis 144 is picked up only by sample tip 128 to provide information about the surface 32. One axis of the photodetector 52 records the reference position, and the other axis thereof records the sample position. Note that z-axis 15 movement is however picked up by both tips 128 and 156. Unwanted noise is removed by taking the difference in the movement using the output from the photodetectors, using principles commonly known to those of ordinary skill in the art to which this invention pertains. Thus, all common mode noise may be canceled.

The sensor 120 may also be used for direct measure of sample stiffness. In order to do so, The two axes (torsion bars 142 and 146) are provided with different stiffnesses (to provide a differential spring constant for the sample), using principles commonly known to those of ordinary skill in the art to which this invention pertains. Cantilever deflection is a linear combination of the sample compliance and the cantilever compliance. Thus, since the two axes have different stiffnesses, a single measurement is made which utilizes deflections from the two axes to solve algebraically for the sample stiffness directly.

The position and shape of the reference tip 156 can be varied. If the reference tip 156 is placed close to the sample tip 128, a high resolution differential contrast image of topology is developed. If the reference tip 156 is placed at the end of an extended arm (i.e., arm 150 having a length, illustrated at 154, of, for example, about 100 microns), the sample tip 128 can then be placed, for example, on a cell and the reference tip 156 placed, for example, on a coverslip to allow the sample tip sufficient clearance above the cell. For increased detail resolution, the two tips 128 and 156 can be placed closer together (for example, an arm length 154 of about 5 microns) to create a differential contrast image of topology or compliance. For single molecule force spectroscopy, the dual axis sensor may provide not only improved high frequency response but also improved low frequency response by removing drift. If the reference tip 156 is large (perhaps flat), it will average over a rough substrate.

When made of thin silicon nitride to be soft, the reference torsion bars 146 maximize force sensitivity. Alternatively, the reference torsion bars 146 may be made of silicon (with the layer 147 of silicon nitride covering the bottomsides thereof in accordance with the process of the present invention) to be stiff to create a more stable reference contact with maximum frequency response.

Figure 10:
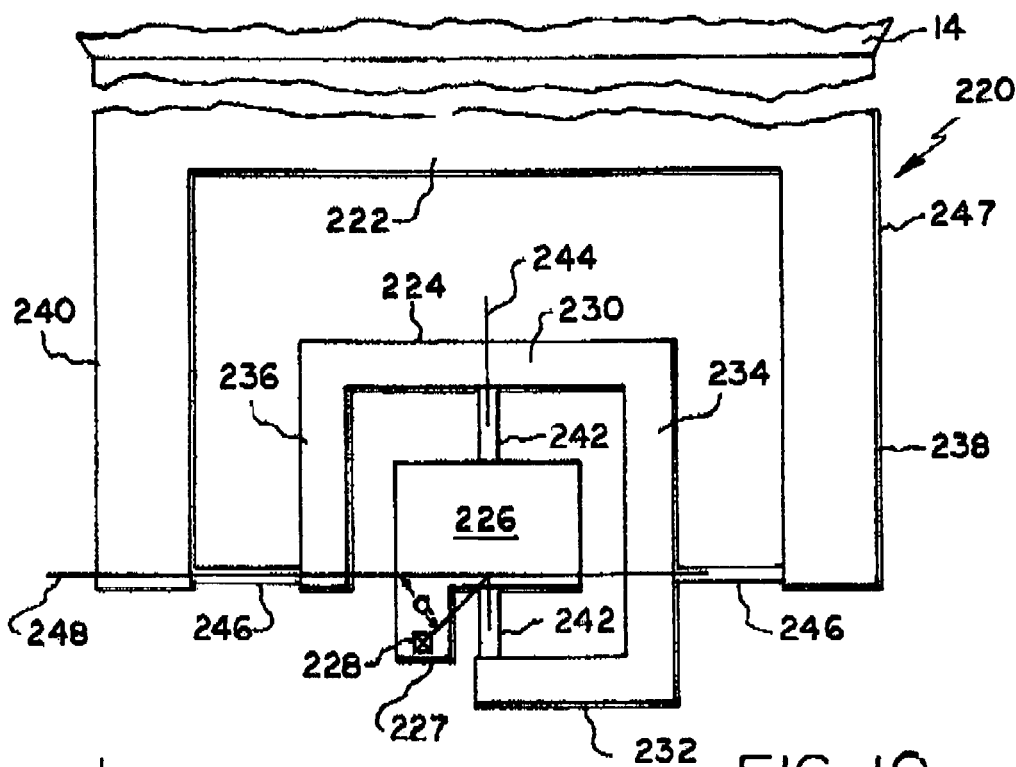
FIGS. 10, 13, 14, 15, and 17 are schematic plan views of a sensor in accordance with additional alternative embodiments of the present invention.
Figure 12:
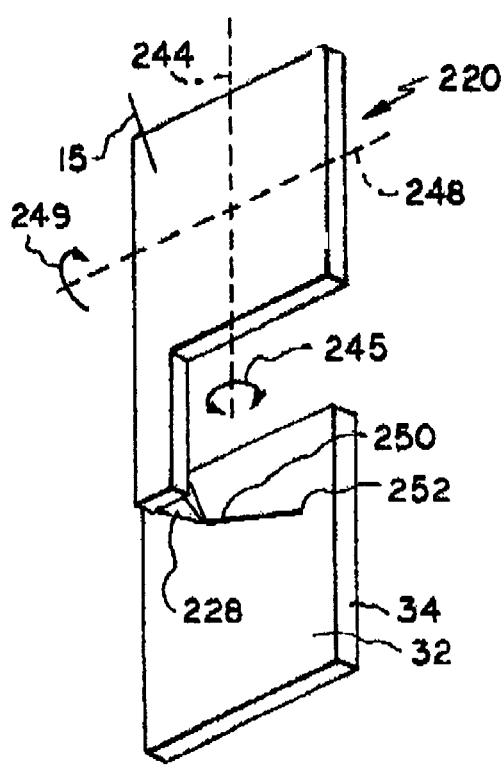
FIGS. 12 and 16 are views of the sensors of FIGS. 10 and 15 respectively illustrating how they work.

Referring to FIGS. 10 and 12, there is illustrated at 220 a two-axis sensor (i.e., having two independent orthogonal data axes 244 and 248 for rotational movement thereabout, as illustrated at 245 and 249 respectively, and having a tip 228 which is asymmetric to both axes 244 and 248, in accordance with another embodiment of the present invention. The sensor 220 is shown in FIG. 12 applied to anchor point 252 detection of a polymer, illustrated at 250, such as a DNA molecule, a protein, etc. tethered to the tip 228, and may have various other applications, as discussed hereinafter.

The sensors shown in FIGS. 13 to 17 also are two-axis sensors. However, these oscillators (FIGS. 10, 11, and 13 to 17) may be used for other purposes other than as sensors. For example, they may be used as two-axis accelerometers. In addition, a tip is not required for a reference probe in these sensors. For example, the end of the reference lever may be permitted to just slide over the surface under examination.

The sensor 220 includes first and second rigid support structures 222 and 224 and a rigid cantilevered member 226 having tip 228, all similar to the corresponding support structures 72 and member 36 and tip 40 except as otherwise shown or hereinafter described. The first support structure 222, similar to support structure 33, is a thinned extension of a handle chip 14. The second support structure 224 is shaped to define a first pair of generally spaced parallel arms 230 and 232 which are connected at ends thereof by a second arm 234. The first arms 230 and 232 straddle the cantilevered member 226, and the first arm 230 extends beyond the cantilevered member 226 as well as beyond the end of the other first arm 232. Another second arm 236 extends from the other end of first arm 230 in a direction generally toward the longitudinal axis of the other first arm 232 and generally parallel to the other second arm 234. The first support structure 222 has a pair of spaced generally parallel arms 238 and 240 which straddle the second support structure 224, its arms 238 and 240 extending generally parallel to arms 234 and 236. A first pair of flexible elongate torsion bars 242 co-axially (along longitudinally axis 244) connect (extending forwardly and rearwardly of the sensor) the cantilevered member 226 to the first arms 230 and 232. A second pair of flexible elongate torsion bars 246 co-axially (along longitudinally axis 248) connect (extending laterally of the sensor) the first support structure arms 238 and 240 to the second arms 234 and 236 respectively. The torsion bars 242 and 246 are similar to torsion bars 76. Similarly as described for FIGS. 3 and 4, the torsion bars 242 and 246 are portions of a single layer, illustrated at 247, of material, similar to material layer 78, which covers and is attached to the bottomsides (but need not entirely cover) of the support structures 222 and 224 and cantilevered member 226, and the sensor 220 (as well as the sensors hereinafter described with reference to FIGS. 13 to 17) may be constructed similarly as described with reference to FIGS. 7a to 7s and attached to chip 14 similarly as shown in FIG. 10.

The optical lever 54 (a laser beam deflecting from the central pad 226) is used to detect deflection of the central pad 226. Each of the deflection axes 244 and 248 will have a well-defined and small spring constant defined and calibrated based on the geometric and material properties, using principles commonly known to those of ordinary skill in the art to which this invention pertains. This provides a desirably very compliant relation between the force applied and the lever movement. The use of two deflection axes 244 and 248 provides the ability to reduce the spring constants for improved sensitivity.

The cantilevered member 226 has a portion 227 which off-sets the tip 228 from both of the torsion bar axes 244 and 248 (i.e., the tip 228 is not located on either of the axes 244 or 248 so that it is asymmetric thereto) to, in one application, allow thermal noise to be filtered (thermal noise reduction) as follows. With only one axis, one cannot detect whether a detection is noise or a signal. Since random noise will produce deflection of the pad 226 that can be detected bi-laterally (deflects the pad 226 along both axes 244 and 248 independently), noise is cross-referenced in two channels and filtered out (the two responses are averaged), improving noise sensitivity by the square root of 2. The normal laser beam 48 illuminates the mirror (i.e., the gold-covered back of the silicon pad 226), and the two orthogonal torsion bar axes 244 and 248 can be decoded by the photodetector 52 in 4 quadrants (bottom-top, left-right), which measures movement of the laser beam 54, which is related to the movement of the tip 228. Z axis noise at higher frequencies is removed by taking the difference of the two signals, after suitable scaling for differences in optical gain of the two axes 244 and 248, and intensity fluctuations of the laser system may also be suppressed. Each of the vibration modes shows up in the orthogonal direction on the photodetector 52. Flexing of the outer gimbal or support structure 224 shows up at, for example, 26 kHz on the bottom-top photodetector channel, while the inner pad or cantilevered member 226 has, for example, a 95 kHz resonant peak on the left-right channel.

This probe 220 may alternatively be used for simultaneous friction and topography when tip 228 is placed coaxially with rotational axis 248 and is displaced from axis 244. In order to use the probe 220 for scanning, z-axis movement is encoded by rotation about axis 244 while sample friction, utilizing the length of tip 228 as a lever, rotates the mirror (cantilevered member) 226 about axis 248.

Another application of two-axis probe 220 is for resolution of the angle (force manipulation) between a tip-linked polymer 250 and the AFM Z axis 15, a situation typical in dynamic force spectroscopy. Off-normal angles cause underestimation of sample stiffness since only the Z component is measured. With high compliance torsion bars 242 and 246 and at small angles, the deflection angle of the cantilevered member 226 will tend to become normal to the axis of the polymer 250. By using x-axis and y-axis feedback to minimize the tipping angle, the center of attachment to the tension axis can be made normal to the substrate. The object is to obtain a vectorial representation of where the anchor point 252 is. This is achieved by measuring the force on both axes 244 and 248 and adding vectorially or alternatively by moving the tip 228 to a position such that there is zero force on one axis and then measuring the force on the other axis, as discussed in greater detail hereinafter.

The lever 226 senses force on the tip 228 (located distance L from the center of the axes 244 and 248) from two orthogonal directions, and force applied to the tip 228 results in a well-defined deflection of the optical lever 54 (PDT top-PDT bottom $\sim L*\sin a$, and PDT left-PDT right$\sim L*\cos a$, where PDT is the photodetector measurement of movement in volts). This directional resolution may be used to detect origin of force applied to the tip 228. Thus, the cantilever tilts to be normal to the axis of the tether 250 to provide a precise measure of sample 250 stillness. Precision can be further improved by using the tilt angle information to feed back to the xy scanner to position the tip 228 directly above the attachment point 252 of the tether 250. Prior to the beginning of an experiment, the angular response or optical sensitivity of the lever is calibrated by monitoring deflection due to near-normal force applied to the tip 228 (force-distance curve on glass). Then, with the tether 250 attached, a comparison of the force applied to the tip 228 that is off-normal the deflection response of the lever to the control response will reveal force directionality. In this manner, the anchor point 252 of the tether 250 may be located in space by minimizing the difference between the control and experimental responses.

Except as described otherwise herein, the sensors illustrated in FIGS. 13 to 17 are two-axis sensors which are similar to sensor 220 of FIGS. 10 and 12, the primary differences being the locations of the torsion bar axes and the tip(s).

Figure 13:
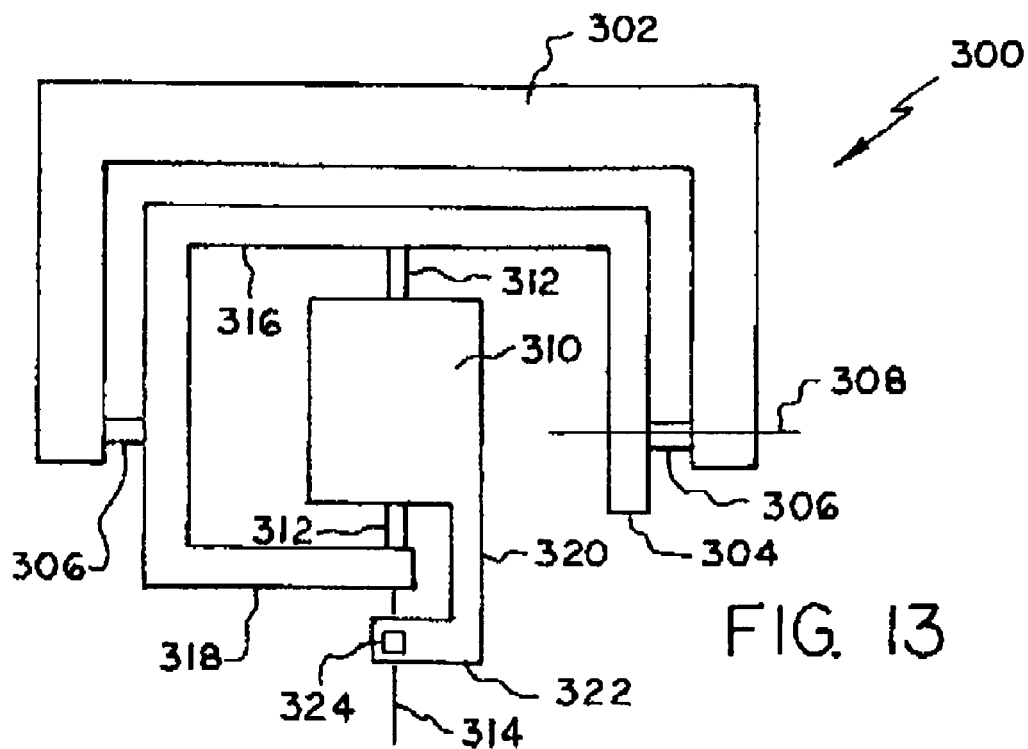

Referring to FIG. 13, there is shown generally at 300 a sensor which may be used for highly sensitive friction experiments. Sensor 300 includes first and second rigid support structures 302 and 304 respectively connected by a pair of torsion bars 306 providing torsion axis 308 for rotational movement of the second support structure (cantilevered member) 304 thereabout, the first support structure 302 being connected to the chip 14. A cantilevered member or pad 310 is disposed between a pair of arms 316 and 318 of second support structure 304 and connected thereto by a second pair of torsion bars 312 respectively providing torsion axis 314 for rotational movement of the cantilevered member 310 thereabout. The leg 318 terminates with its connection to its respective torsion bar 312. The x and y axes 308 and 314 are perpendicular or otherwise orthogonal to each other, as are the axes for other sensors disclosed in this specification.

Cantilevered member 310 has an L-shaped extension comprising a leg 320 which extends in the y-direction 19 beyond the leg 318 and another leg 322 which extends from the outer end of leg 320 in an x-direction 17 to support a tip 324 on or along the y axis 314 so that it is sensitive to the torque produced by dragging the tip 324 across a surface 32. As a result, it is provided so as to be optimal for frictional measurements due to a large increase in optical gain occasioned thereby. The x axis 308 is used to detect sample topology (force contact or force set point). Such a lever is provided to allow ultra-sensitive frictional recording (PDT left-PDT right) at highly controlled contact forces (PDT top-PDT bottom). The tip 324 is spaced from the x axis 308 and from the center of the sensor 300. However, the position of the tip 324 can be varied along the length of the y-axis 314 for additional recording or feedback applications.

Figure 14:
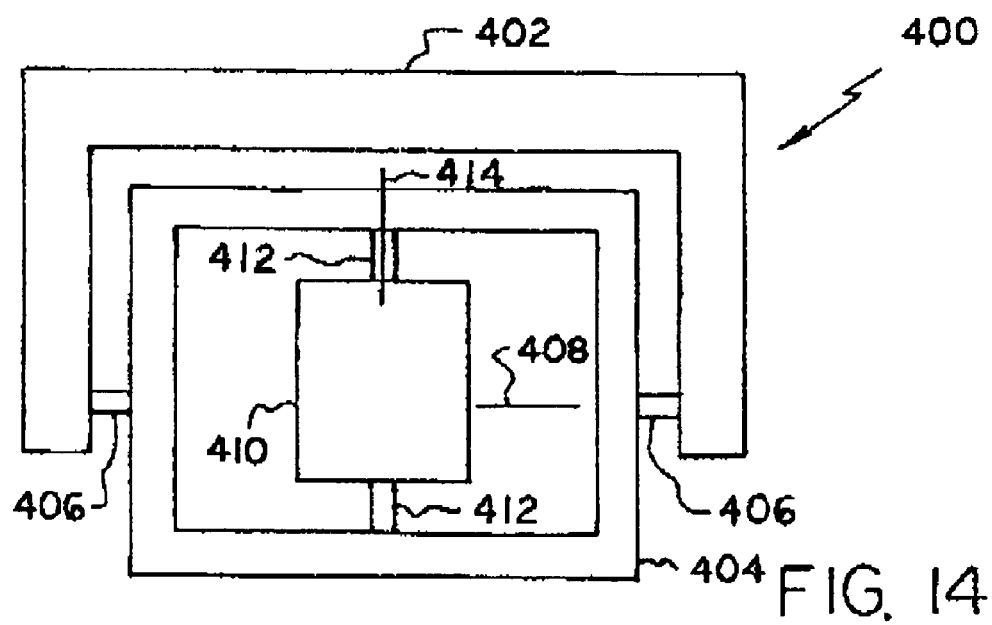

Referring to FIG. 14, there is shown generally at 400 a sensor which may also be used for friction experiments, more particularly to examine frictional characteristics of biological cells. Sensor 400 includes first and second rigid support structures 402 and 404 respectively connected by a pair of torsion bars 406 providing torsion axis 408 for rotational movement of the rectangular second support structure (cantilevered member) 404 thereabout, the first support structure 402 being connected to the chip 14. A cantilevered member or pad 410 is disposed within the rectangular second support structure 404 and connected thereto by a second pair of torsion bars 412 providing torsion axis 414 for rotational movement of the cantilevered member 410 thereabout. The x and y axes 408 and 414 are perpendicular or otherwise orthogonal to each other, as are the axes for other sensors disclosed in this specification.

Figure 15:
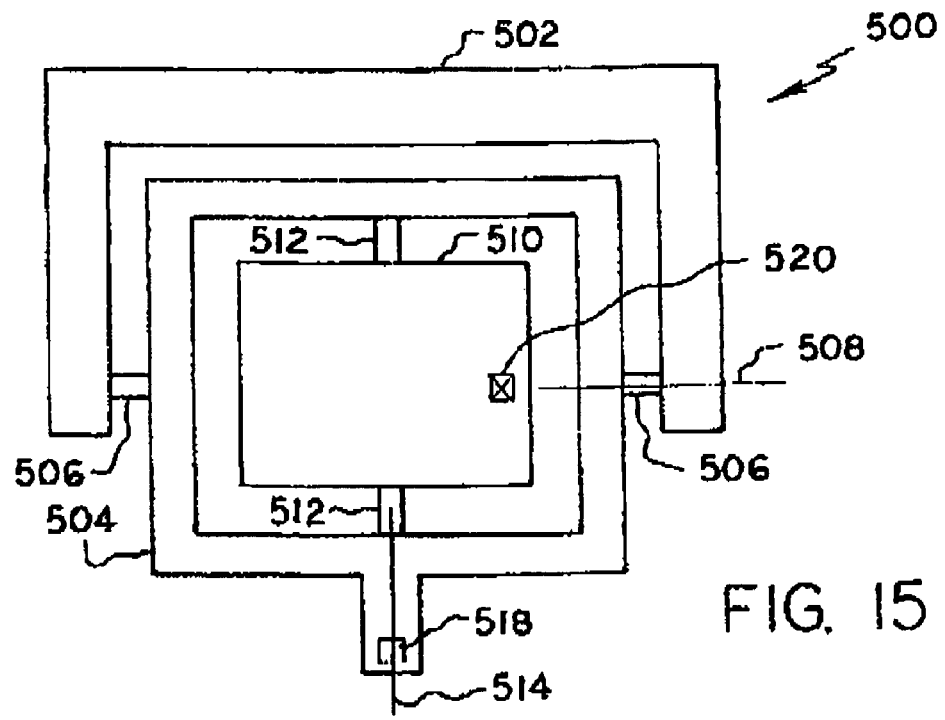
Figure 16:
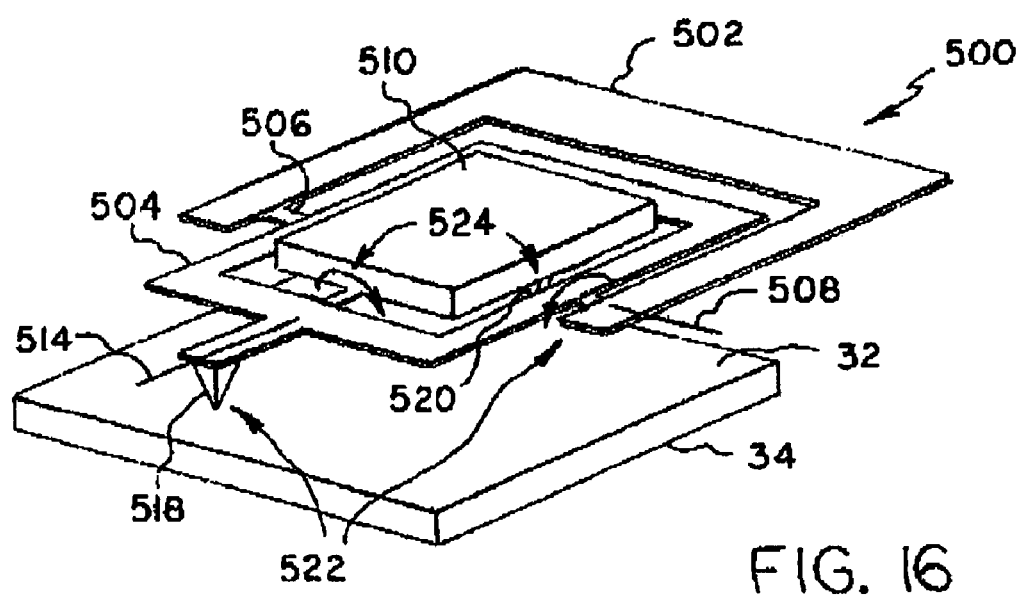

Unlike other sensors shown in this specification, cantilevered member 410 does not have a tip. Instead, biological cells are attached or cultured on the cantilevered member 410 and then brought into contact with the sample at controlled interaction forces to examine frictional characteristics of the biological cells in two orthogonal directions looking for anisotropy of the sample. Referring to FIGS. 15 and 16, there is shown generally at 500 a sensor which may be used for drift-free and reduced noise operation. Sensor 500 includes first and second rigid support structures 502 and 504 respectively connected by a pair of torsion bars 506 providing torsion axis 508 for rotational movement of the rectangular second support structure (cantilevered member) 504 thereabout, the first support structure 502 being connected to the chip 14. A cantilevered member or pad 510 is disposed within the rectangular second support structure 504 and connected thereto by a second pair of torsion bars 512 providing torsion axis 514 for rotational movement of the cantilevered member 510 thereabout. The x and y axes 508 and 514 are perpendicular or otherwise orthogonal to each other, as are the axes for other sensors disclosed in this specification.

A leg 516 extends in the y direction 514 outwardly from the second rigid support structure 504 (away from the chip 14) and supports a first tip 518 on or along the y axis 514, which tip 518 is accordingly offset from the x axis 508. The cantilevered member 510 supports a second tip 520 on or along the x axis 508 and offset from the y axis 514.

Tip 518 and the rotation about the x axis, as indicated by 522 is used for referencing (measuring the position on the substrate 34). Tip 520 and the rotation about the y axis, as indicated by 524, is used for measurement of the position of the sample (the actual physical force of attachment). The reference tip 518 is placed to touch the substrate 34 first and records the sum total of all deflections of the microscope relative to the substrate 34 (PDT top-PDT bottom). The measurement or sample tip 520 is caused to engage and interact with the sample under study and record PDT left-PDT right to monitor the experiment forces (with option to cross-reference with the reference signal). The computer 56 then scales and subtracts the two measurements to remove all common mode noise.

Figure 17:
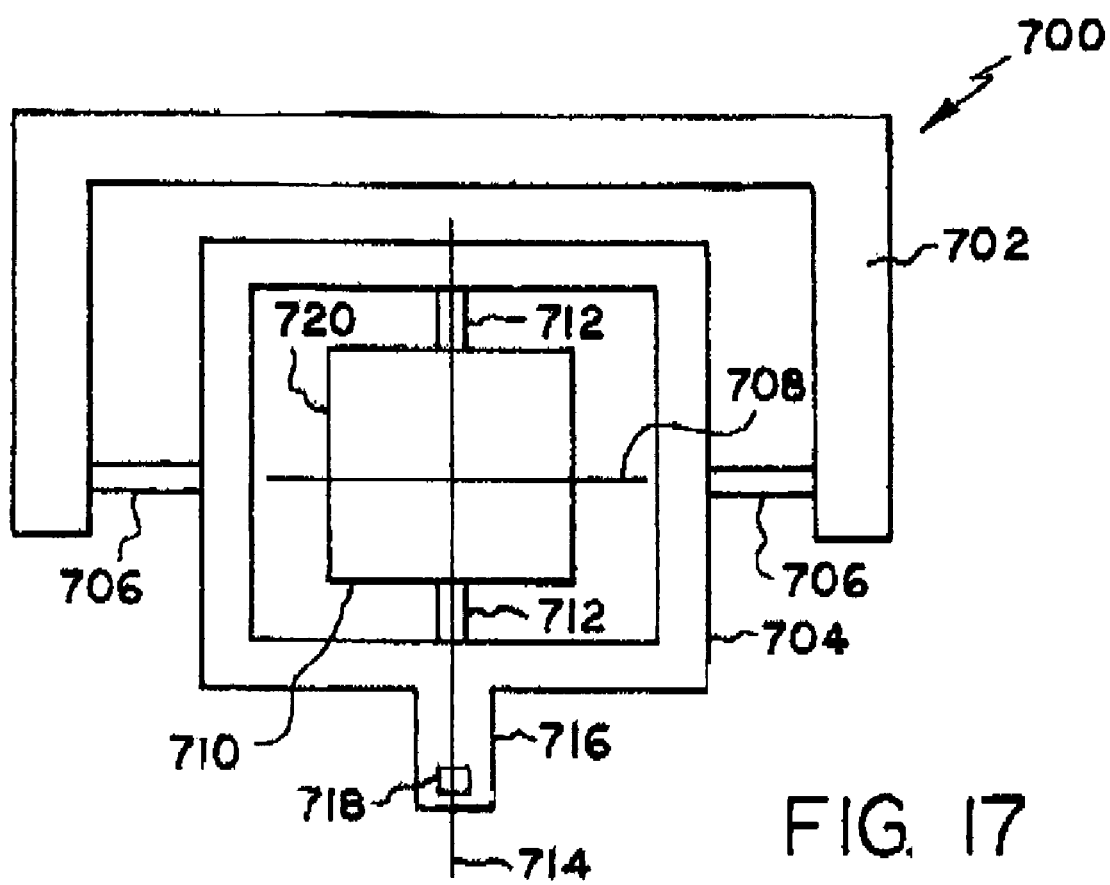

Referring to FIG. 17, there is shown generally at 700 a sensor which may be used for measurement of friction while referencing the substrate 34 (optimize lateral recording). Sensor 700 has first and second rigid support structures 702 and 704 respectively connected by a pair of torsion bars 706 providing torsion axis 708 for rotational movement of the rectangular second support structure (cantilevered member) 704 thereabout, the first support structure 702 being connected to the chip 14, similarly as the corresponding elements in sensor 500. A cantilevered member or pad 710 is disposed within the rectangular second support structure 704 and connected thereto by a second pair of torsion bars 712 providing torsion axis 714 for rotational movement of the cantilevered member 710 thereabout, similarly as the corresponding elements in sensor 500. The x and y axes 708 and 714 are perpendicular or otherwise orthogonal to each other, similarly as the corresponding elements in sensor 500. A leg 716 extends in the y direction 714 outwardly from the second rigid support structure 704 (away from the chip 14) and supports a reference tip 718 on or along the y axis 714, which tip 718 is accordingly offset from the x axis 708, similarly as the corresponding elements in sensor 500.

The cantilevered member 710 supports a friction measurement tip 720 on or along the x axis 708 and also on or along the y axis 714 (i.e., at the intersection of the x and y axes) to optimize measurement of friction while also referencing the substrate 14. The reference tip 718 is placed onto the substrate 14 and used to monitor position of the substrate 14 and noise. When the sample is sheared across (either x or y directions), the tip 720 is optimally sensitive but has little or no sensitivity to normal force (z direction 15) due to its being at the intersection of the axes 708 and 714.

Figure 7A:
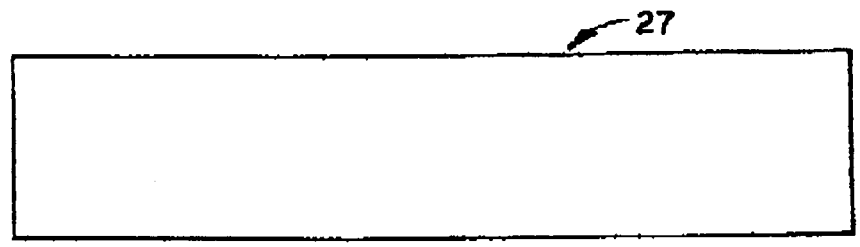
FIGS. 7a to 7s are schematic views, taken along lines 7s-7s of FIG. 1, of a sequence of steps applied to a wafer in making the sensor of FIG. 1.
Figure 7B:
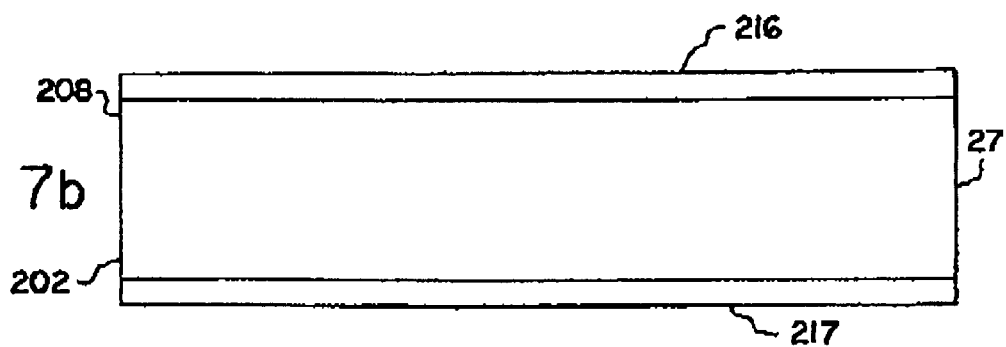
Figure 7C:
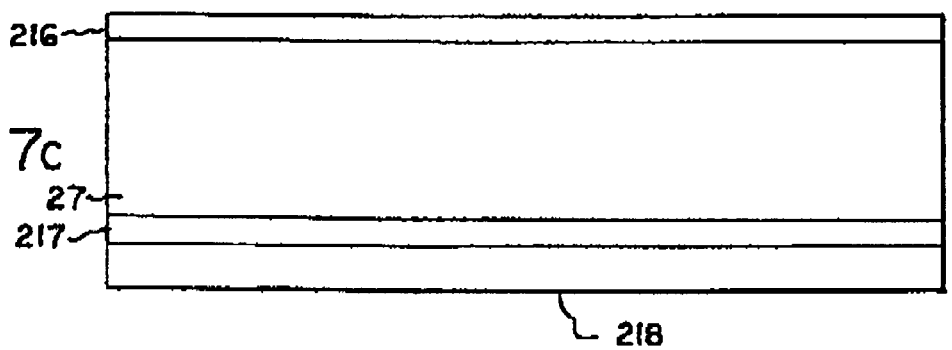
Figure 7D:
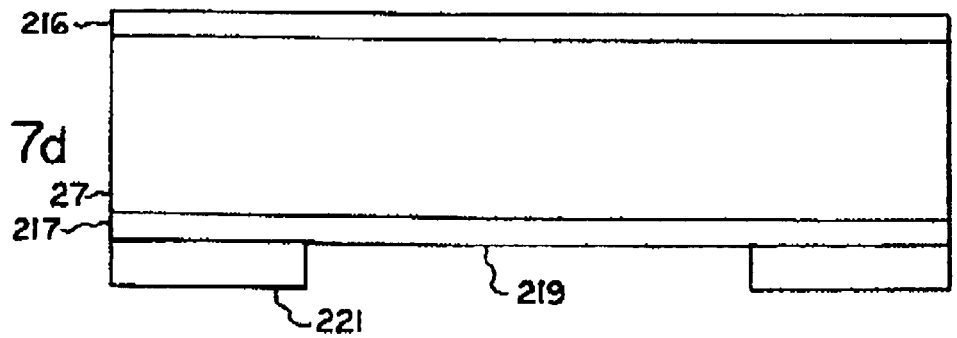
Figure 7E:
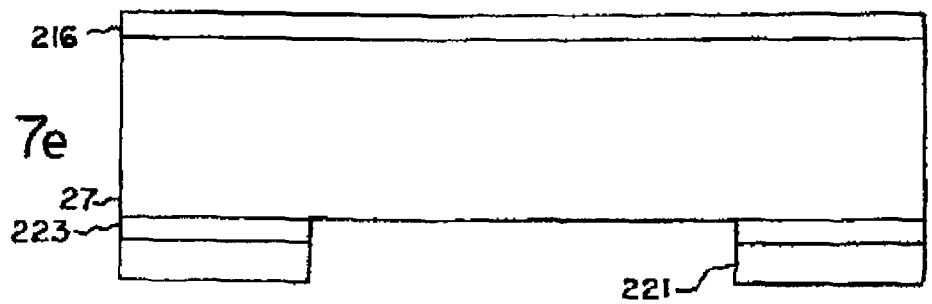
Figure 7F:
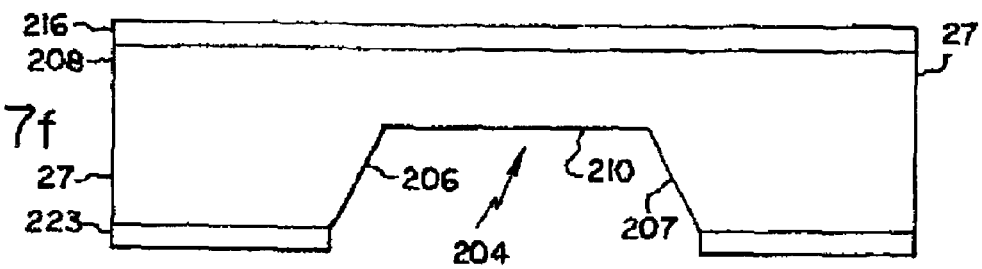
Figure 7G:
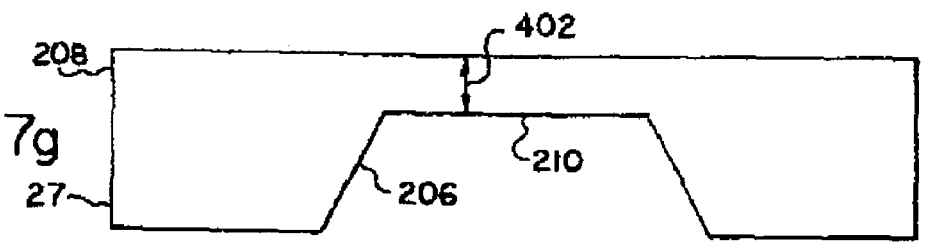
Figure 7H:
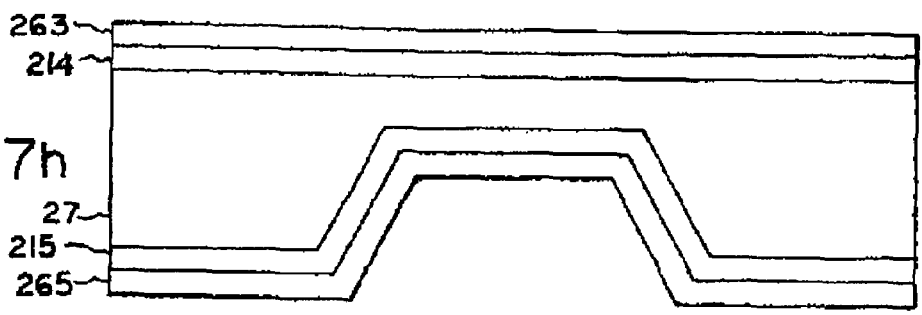
Figure 7I:
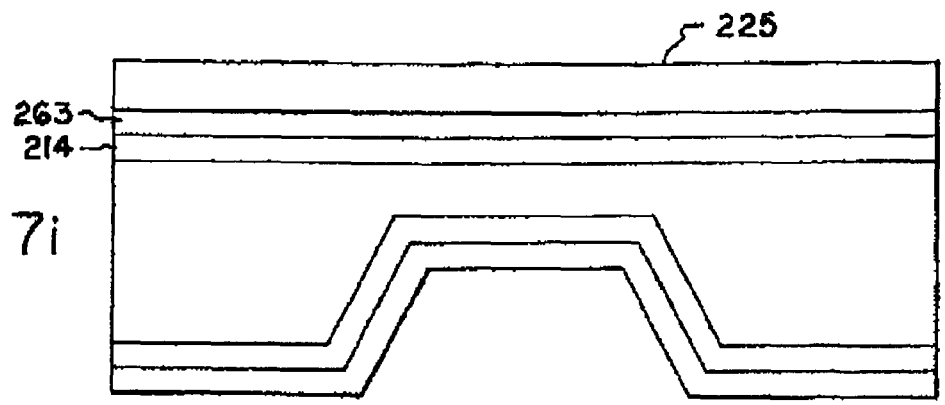
Figure 7J:
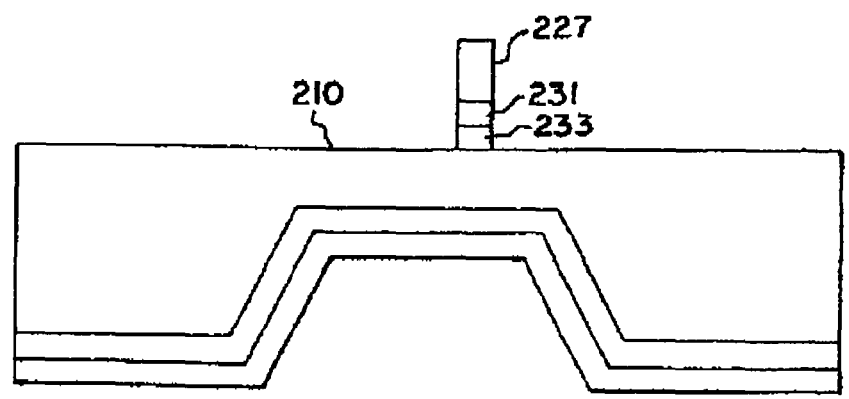
Figure 7K:
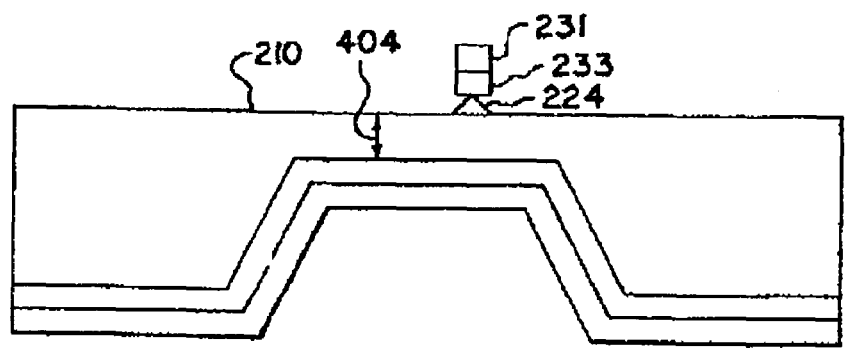
Figure 7L:
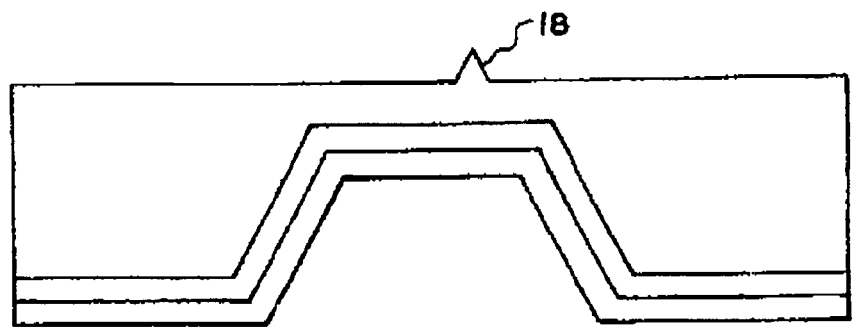
Figure 7M:
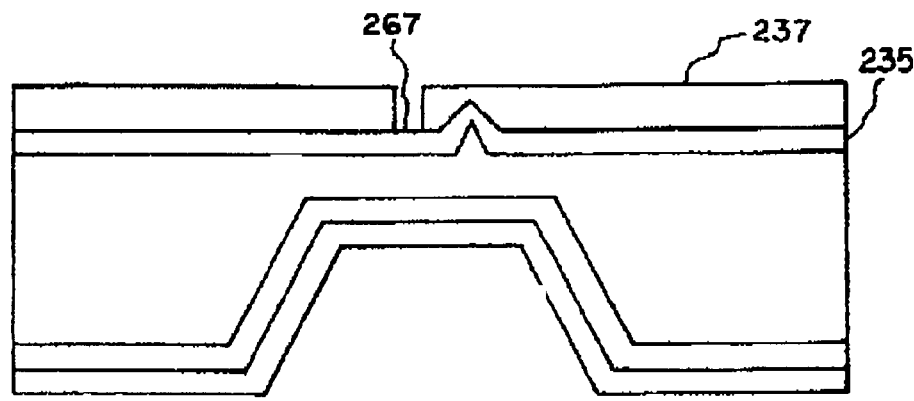
Figure 7N:
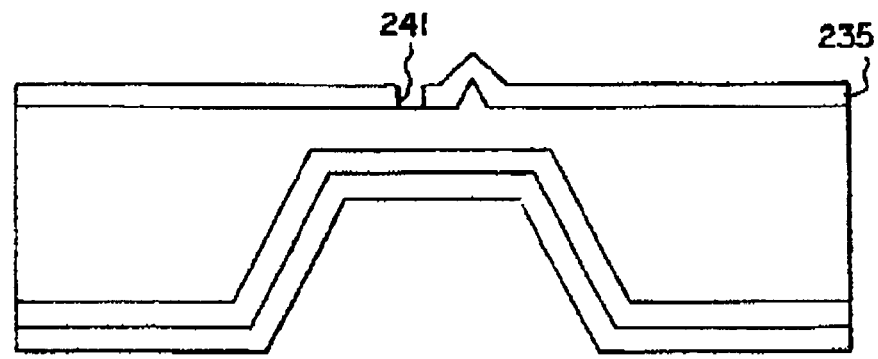
Figure 7O:
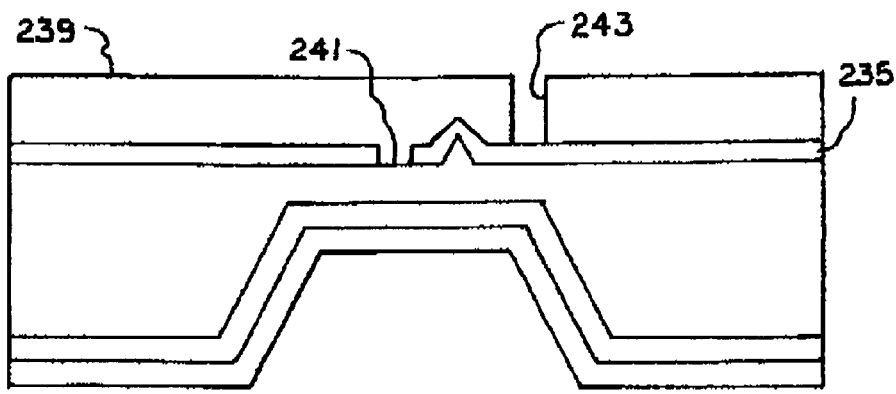
Figure 7P:
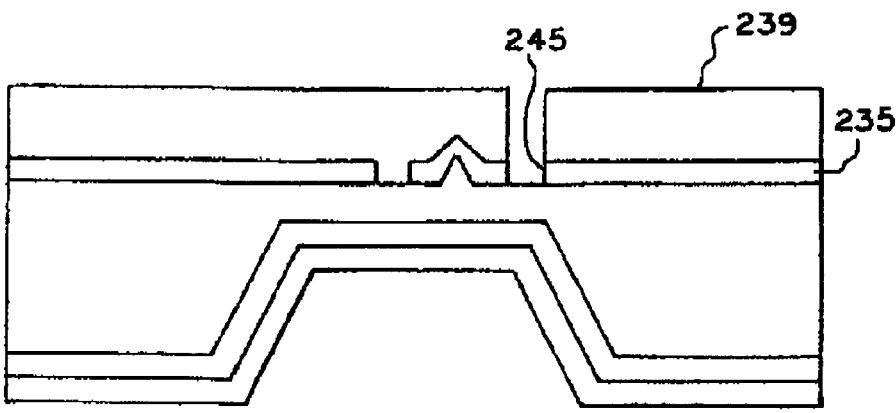
Figure 7Q:
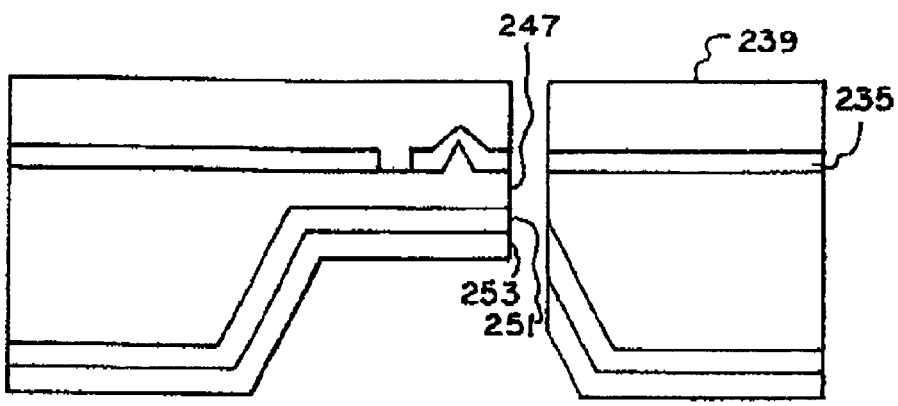
Figure 7R:
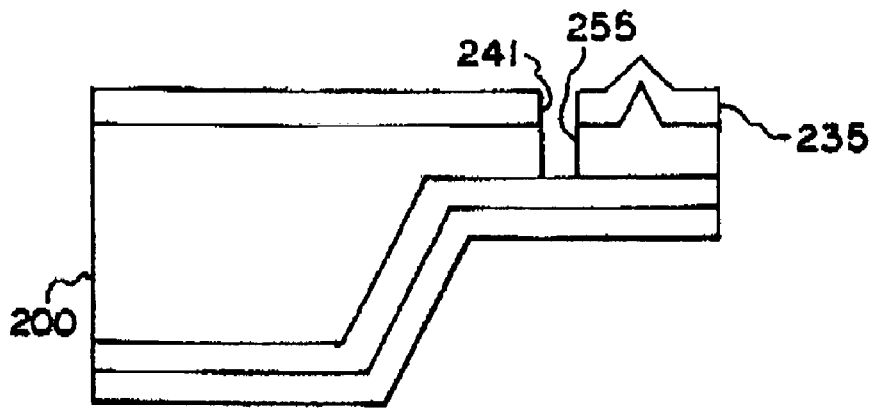
Figure 7S:
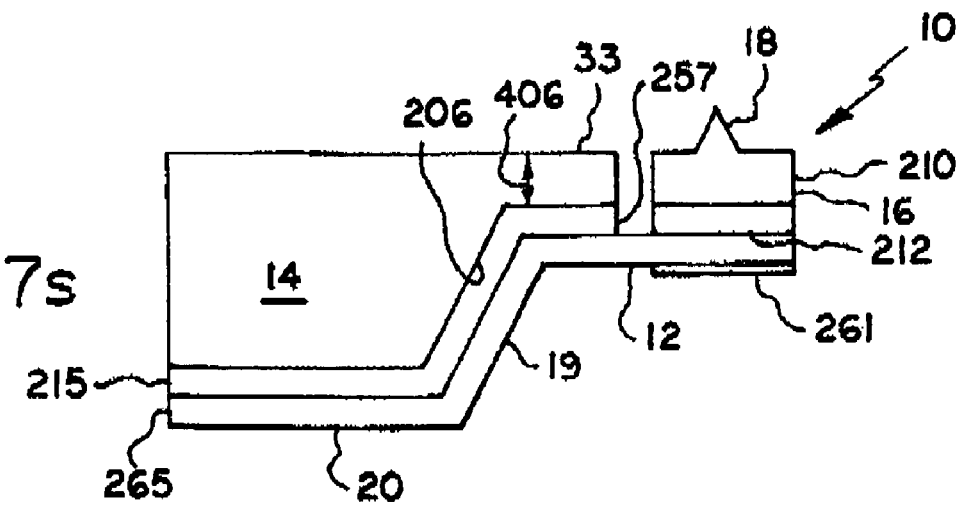

Reference torsion bars 706 may be made soft using thin silicon nitride to provide higher precision, as otherwise discussed herein particularly with reference to FIGS. 7a to 7s, or made stiff using thick silicon to reduce noise by strongly coupling to the substrate 14.

Referring to FIGS. 7a to 7s, there is illustrated a sequence of steps for mass production of sensor 10 (FIG. 7s). However, one of ordinary skill in the art can use similar principles and apply similar steps to produce sensors 38, 100, and 120 and the other sensors shown herein and other oscillators with torsion bars with a wide variety of geometries and mechanical properties (sizes, spring constants, etc.), including custom shapes and modes of motion, on a single inexpensive die using standard micro-fabrication equipment. For example, FIG. 7s could be considered to partially illustrate sensor 38 wherein reference numeral 12 instead illustrates one of the torsion bars 76, reference numeral 16 instead illustrates cantilevered member 36, reference numeral 18 instead illustrates tip 40, and reference numeral 33 instead illustrates thin support structure 70. Thus, the principles discussed hereinafter for formation of the hinge 12, cantilevered lever 16, tip 18, and thin support structure 33 should be considered as also applying, as applicable, to the formation of each of the torsion bars 76, cantilevered lever 36, tip 40, and thin support structure 70 respectively.

It is considered desirable that the cantilevered member 12 as well as the support structure be of adequate stiffness so that the entire sensor does not undesirably flex while it is also considered desirable that the torsion bars or hinges have the flexibility or softness for the desired compliance, so that they can suitably act as springs in allowing the tip to move freely over the surface 32 (or otherwise detect the surface 32) similarly as a stylus is allowed to move freely over a record being played. However, when the sensors are made entirely of silicon, the torsion bars or hinges cannot be easily made thin enough, unless expensive E-beam lithography is used, to be sufficiently compliant, because it is difficult to keep the etchant from continuing to eat away and "dissolve" the hinge when the desired thickness (i.e., very thin) is obtained. On the other hand, when the cantilevers are made entirely of silicon nitride, the cantilevered members and support structure are considered to not be sufficiently stiff. In order to obtain the desired stiffness for the cantilevered members and support structure while providing the desired flexibility or softness to the torsion bars or hinges so that they suitably act as springs, without the use of expensive E-beam lithography, in accordance with the present invention, the cantilevered members 16 (and tips 18) and support structure 14 are made of one material and the hinges 12 (or 76) are made of another material which is applied as a thin layer 20 to the first material and which is desirably insensitive to or at least substantially less sensitive to the etchant used for etching the first material. The etchant is thus selective for the first material. By an etchant being "selective" for one of two materials is meant, for the purposes of this specification and the claims, that the etchant is such as to readily etch the one material as compared to the other material, which is left substantially unetched, during an etching process. The first material is then etched all the way through it to the layer of second material (wherein the etching ceases due to the insensitivity of the second material to the etchant) to form the thin compliant hinge 12. The etchant is In order to mass produce such composite material micro-mechanical oscillators such as oscillator 10 (wherein the cantilevered member 16 thereof oscillates), in accordance with the present invention, a quantity of sites on the wafer 27 (FIG. 11) of a first material such as silicon are etched to define support structures (handle chips 14) as more particularly described hereinafter, the layer 20 of the second material is deposited on each site (over the entire wafer 27), and the oscillator hinges 12 (or torsion bars 76) are patterned in the sites, including etching all the way through the first material to form each hinge of the second material, as more particularly described hereinafter. As used herein and in the claims and unless otherwise specified or apparent in this specification, the term "flexible hinge" is meant to include "torsion bar." Each handle chip 14 is made to be easily removed from the silicon wafer 27 by etching all the way through the wafer to define three handle chip sides, as illustrated at 29 in FIG. 11, and pre-etching along the fourth side, then, when the chip has been formed, breaking along the resulting pre-etched edge 25 to remove it from the wafer 27. The resulting oscillator 10 is thus supported on a large silicon die (handle chip 14) which can advantageously be used for easy manipulation and device support and can be produced of standard micro-fabrication materials (discussed hereinafter) to have very thin compliant hinges or torsion bars and very stiff support structures and cantilevered members.

The silicon wafer 27 is preferably of the type having a 100-orientation (<100>), a crystal orientation wherein the wafer is formed by cutting along a plane known as the 100-oriented plane. Silicon wafers with different crystal orientations (such as, for example, <110>) may be used, but subsequent processing thereof, as described hereinafter, will result in different die (handle chip) shapes.

As shown in FIG. 7b, the topside 208 and the bottomside or backside 202 of the wafer 200 are simultaneously coated with layers 216 and 217 respectively of silicon nitride (preferably high quality silicon-rich SiN) using the well known in the art technique of low pressure chemical vapor deposition (LPCVD). These silicon nitride layers 216 and 217 will later be removed (they are shown to have been removed in FIG. 7g) after bottomside silicon nitride layer 217 serves as a KOH etch mask. Although the LPCVD technique normally results in both layers 216 and 217 being deposited on the wafer, it should be noted that the present invention does not require that layer 216 be applied to the wafer.

A layer 218 of photoresist is then applied to the bottomside silicon nitride layer 217, as shown in FIG. 7c. A portion of the photoresist layer 218 is removed, as seen in FIG. 7d, using UV (ultraviolet light) contact-microlithography and aqueous development, which are well known techniques to those of ordinary skill in the art to which this invention pertains, to expose a portion 219 of the bottomside silicon nitride layer 217 for the hereinafter described etching (the unremoved portion 221 of the photoresist layer 218 serving to mask the portion of the layer 217 not to be etched).

Referring to FIG. 7e, with the photoresist portion 221 serving as a mask, the silicon nitride portion 219 is removed by the well known in the art technique of reactive ion etching (RIE) with CHF3 (trifluro methane), leaving silicon nitride portion 223. The photoresist layer 221, no longer needed, is then removed.

As seen in FIG. 7f, with silicon nitride portion 223 serving as an etch mask, the silicon wafer 27 is etched using aqueous potassium hydroxide (KOH), and the etching proceeds anisotropically, in accordance with principles commonly known to those of ordinary skill in the art to which this invention pertains, to define a crater 204 having inwardly slanted walls 206 and 207, and slanted wall 206 will become coated, as hereinafter described, to define the slanted wall 19 of the handle chip 14, as best seen in FIG. 7s. The pattern is defined by optical photo-lithography and RIE (reactive ion etch) etch of LPCVD silicon nitride. The etch is conducted to proceed most of the way through the thickness of the wafer 27, leaving centrally along the topside 208 of the wafer 200 a thin membrane 210 (having a thickness, illustrated at 402, in the neighborhood of 10 to 20 microns, for example, about 10 microns) that is stiff in comparison with the much thinner to be formed hinge 12. This membrane 210, which will be thinned more (but still be sufficiently thick to have the desired stiffness) during further processing as will be hereinafter described, will later be formed into the cantilevered member 16, tip 18, and the support structure front end portion 33 of the sensor 10, as best seen in FIG. 7s.

In addition to providing a chip handle (enlarged portion) with a sloped front end 19 to increase the optical clearance, the anisotropy of the KOH etch is also used to produce chips (sensors) that are solidly supported by the wafer throughout processing and can be easily removed from the wafer by controlled fracture along pre-etched edge 25 (FIG. 9).

Figure 8:
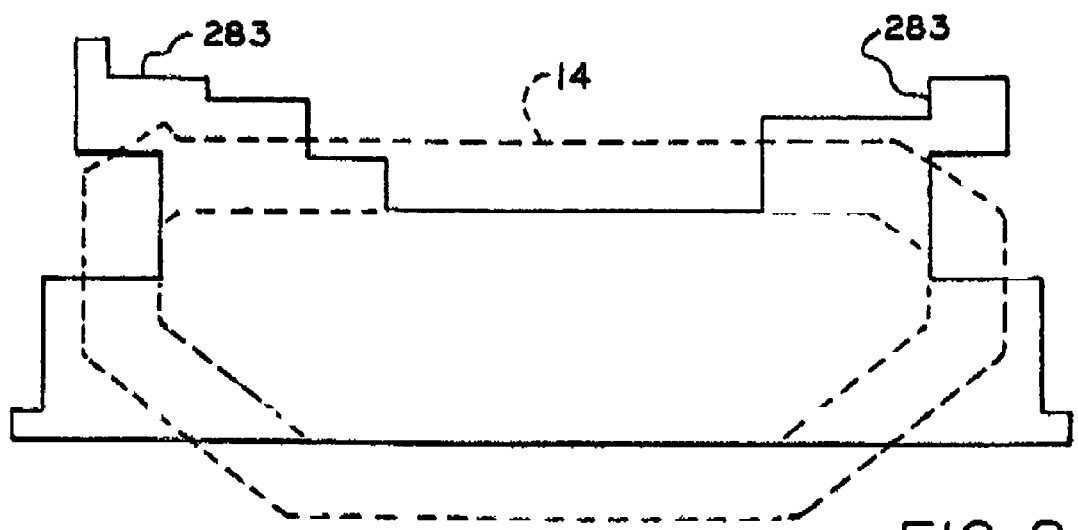
FIG. 8 is a schematic representation of a template (mask) for forming the handle chip, illustrated in dashed lines, of FIG. 1.

A common problem for KOH-assisted definition of silicon blocks is convex corner undercutting. During the etch, low density high etch-rate Miller planes are exposed resulting in significant rounding. See W. Chang Chien et al, "On the Miller-indices Determination of Si-100 Convex Corner Undercut Planes," *Journal of Micromechanics and microengineering*, vol. 15, 2005, pp 833-842; and X. Wu et al, "Compensating Corner Undercutting in Anistropic Etching of (100) Silicon," *Sensors* and *Actuators*, vol. 18, 1989, pp 207-215. A set of compensation structures (which may be called dog-ears, illustrated at 283 in FIG. 8, and which are well known in the art to which the present invention pertains), which are empirically designed to protectively minimize undercut, are preferably provided at the corners to allow production of nearly rectangular chip handles sized to fit standard AFM holders (1.8 mm×3 mm). They can be empirically designed and provided using principles commonly known to those of ordinary skill in the art to which this invention pertains, following the procedures described in the above W. Chang Chien et al and X. Wu et al articles.

To fabricate the membrane 210 desirably of controlled thickness, inexpensive and reproducible in situ rulers are preferably used, which can be used in accordance with principles commonly known to those of ordinary skill in the art to which this invention pertains using the process as described in P. Chang, "A method Using V-grooves to Monitor the Thickness of Silicon Membrane with uM Resolution," *J. Micromech. Microeng.*, vol. 8, 1998, pp 182-187. For example, the membrane 210 may be initially produced to have a thickness, illustrated at 402 in FIG. 7g, of 10 to 20 microns, then thinned during tip production to have a thickness, illustrated at 404 in FIG. 7k, of 5 to 10 microns, then further thinned during the tip making process to a thickness, illustrated at 406 in FIG. 7s, of about 5 microns (the resulting thickness of the cantilevered member 16 and thin support structure portion 33).

In addition to being of controlled thickness, the bottomside 212 (FIG. 7s) of the membrane 210 (the side which will be opposite the tip) should be optically flat to suitably reduce light scattering as the laser beam 48 is reflected from the cantilevered member surface. In order to produce such an optically flat membrane 210, in accordance with a preferred embodiment of the present invention, the procedure which is used is one in which KOH and IPA (isopropyl alcohol) are used as follows. Approximately an hour before the finish of the KOH etch to produce the membrane 210, the bath temperature is decreased to about 50 to 60 degrees C., and about 10 to 15 percent IPA is added to the 50% KOH solution. The etch then proceeds at a lower rate, resulting in a smoother surface.

As illustrated in FIGS. 7g and 7h, topside layer 216 and bottomside layer 217 of silicon nitride are removed and replaced by a thin film stack of (1) first a layer 214 and a layer 215 (for the topside and bottomside respectively) of silicon dioxide then (2) secondly a layer 263 and a layer 265 (for the topside and bottomside respectively) of silicon nitride (preferably high quality silicon-rich SiN) using the well known in the art technique of low pressure chemical vapor deposition (LPCVD).

The bottomside SiN layer 265 is later patterned into the hinge 12, as best seen in FIG. 7s. In order to achieve a suitable hinge compliancy, the silicon nitride layer 265 has a thickness less than about 400 nanometers, preferably less than about 100 nanometers, for example, about 50 nanometers. It may be as thin as about 10 nanometers.

The topside silicon dioxide layer 235 is provided to serve as protection (i.e., support the tip region) until the final release, i.e., it is shown in FIG. 7r and is shown as having been removed in FIG. 7s. A silicon dioxide thickness of about 100 nanometers is considered to be adequate to protect the hinge during processing. The topside silicon nitride layer 263 is provided so that portion 231 (FIGS. 7j and 7k) thereof serves as a mask for thinning the membrane 210 and formation of the tip 18.

The bottomside thin film layers 215 and 265 bear intrinsic mechanical stress, tensile for silicon nitride and compressive for silicon dioxide, which could cause hinge warping (when the hinge is asymmetric). However, when the hinge means is two symmetric torsion bars 76 (as in FIG. 3), such stress-induced curvature is advantageously not observed to occur.

The production of the tip 18 begins with the application of a layer 225 of photoresist onto the topside silicon nitride layer 263, as seen in FIG. 7i, followed by micro-lithographic removal of the photoresist 225 except for a portion 227 thereof for masking the position in the wafer where the tip 18 will be formed, as seen in FIG. 7j. With the exception of portions 231 and 233 beneath the photoresist mask 227, the topside layers 263 and 214 respectively are patterned (removed) by RIE etching down to the thin membrane 210, leaving layer stack portion 227, 231, and 233, as shown in FIG. 7j. The photoresist mask 227 (no longer needed) is then removed.

As illustrated in FIG. 7k, the top surface to a depth of, for example, 5 microns, of the membrane 210 next to and on both sides of the stack portions 231 and 233 is removed by a short reactive ion etch (RIE), forming a masked silicon island or raised portion (for example, 5 square microns) which will become the tip 18. The tip 18 is formed by a controlled undercutting of the small masked island, as illustrated at 224, using any of several well known in the art processes, which are described in A. Boisen et al, "AFM Probes with Directly Fabricated Tips," *Journal of Micromechanics and Microengineering*, vol. 6, 1996, pp 58-62; T. Albrecht et al, "Microfabrication of Cantilever Styli for the Atomic Force Microscope," *Journal of Vacuum Science & Technology A*, vol. 8, 1990, pp 3386-3396; J. Brugger et al, "Silicon Cantilevers and Tips for Scanning Force Microscopy" *Sensors and Actuators A: Physical*, vol. 34, 1992, pp 193-200; and J. Itoh et al, "Fabrication of an Ultrasharp and High-aspect-ratio Microprobe with a Silicon-on-insulator Wafer for Scanning Force Microscopy," *J. Vac. Sci. Technol. B*, vol. 13, 1995, pp 331-333. The tip 18 is formed when the etchant undercuts the island (layer stack 231 and 233) sufficiently to lift the island off (which layer stack 231 and 233 is discarded as no longer needed), as seen in FIG. 7l. As used herein and in the claims, the term "undercutting" is defined as the cutting or etching of a wafer portion which is beneath a masking material. We have produced high-aspect (for example, a base of 5 microns and a height of 5 microns) atomically sharp tips by undercutting LPCVD silicon dioxide (stack portion 233) with $SF_6$ (sulfur hexafluoride) while silicon nitride stack portion 231 serves to protect the tip region during such processing. Since three types of masks (silicon nitride, silicon dioxide, and photoresist) are available, a variety of other chemistries may be used to produce the tip 18. Silicon nitride (SiN) is an excellent mask for KOH etch; silicon dioxide is a good mask for deep reactive ion etch (DRIE); and photoresist is a good mask for $SF_6$. We have also made lower-aspect-ratio (height to width of, for example, about 1.2) tips, with cone angles of about 70 degrees, using silicon nitride (SiN) as a mask and KOH for an anisotropic undercut. Such tips, which may have broad bases, four-fold symmetry, and atomically flat walls, have well-defined shapes and are considered suitable for use with soft biological materials. We have been able to produce taller tips by pre-etching a small post using DRIE prior to release by $SF_6$ and KOH. See the previously cited Brugger et al, Boisen et al, and Albrecht et al articles. Tips may be further sharpened by oxidation without additional processing if dry silicon dioxide is grown during the further processing steps discussed hereinafter. See R. Marcus et al, "The Oxidation of Shaped Silicon Surfaces," *Journal of the Electrochemical Society*, vol. 129, 1982, pp 1278-1282; and R. Marcus et al, "Formation of Silicon Tips with Less-than-1 Nm Radius," *Applied Physics Letters*, vol. 56, 1990, pp 236-238. Once the tip 18 is produced, it is protected throughout the rest of the process by applying over the wafer topside a thin layer 235 of plasma-enhanced chemical vapor deposited (PECVD) silicon dioxide, as illustrated in FIG. 7m.

After forming the tip 18, the hinge 12 and oscillator (cantilevered member) 16 are defined or formed, beginning with deposition of plasma-enhanced chemical vapor deposited (PECVD) silicon dioxide as layer 235 and then the application of a layer 237 of photoresist, as shown in FIG. 7m, wherein the layers 235 and 237 serve as a double mask. A portion of the photoresist layer 237 above where the hinge 16 will be, illustrated at 267 in FIG. 7m, is removed by imaging the hinge (or torsion bar) shape therein. With the photoresist layer 237 masking the rest of the silicon dioxide layer 235, the hinge shape, illustrated at 241, is then etched in the silicon dioxide layer 235 using CHF3 RIE, as shown in FIG. 7n. The photoresist mask 237 (no longer needed) is then removed.

As illustrated in FIG. 7o, a new photoresist layer 239 is applied (spun-on) over the patterned hinge shape 241 and over the silicon dioxide layer 235. Next, the entire probe structure (handle chip) 14 is imaged onto the photoresist 239, resulting in removal of a portion of the photoresist mask 239, as shown at 243, which corresponds to the silicon etching illustrated at 29 in FIG. 11 along three of the sides of the handle chip 14. With the photoresist layer 239 masking the rest of the silicon dioxide layer 235, The handle chip shape is then etched into the silicon dioxide layer 235, as illustrated at 245 in FIG. 7p, using CHF3 RIE.

Figure 11:
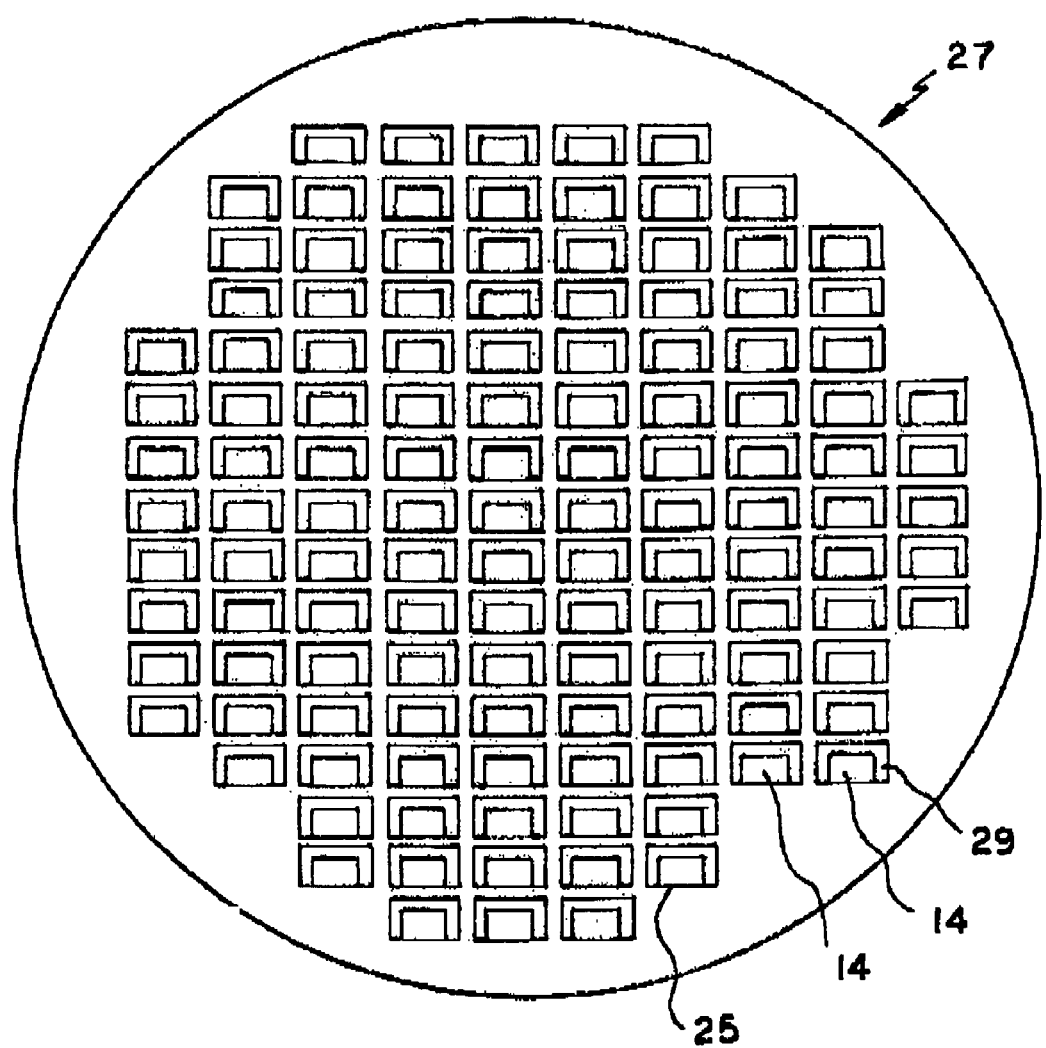
FIG. 11 is a schematic view of a wafer illustrating the formation therein of a multitude of the handle chips.

Referring to FIG. 7q, the silicon around the cantilevered member 16 (with the exception of the area where the hinge 12 will be located) and around the three sides of the handle chip, as illustrated at 29 in FIG. 11, is then etched, as shown at 247, using the inductively coupled plasma reactive ion etch (ICP-RIE) $C_4H_8/SF_6$, as described in F. Laermer et al, "Challenges, Developments and Applications of Silicon Deep Reactive Ion Etching," *Microelectronic Engineering*, vol. 67-68, 2003, pp 349-355, which procedure can be followed using principles commonly known to those of ordinary skill in the art to which this invention pertains. Then CHFR-RIE etching is used to remove the underlying silicon dioxide and silicon nitride layer portions, as shown at 251 and 253 respectively.

As seen in FIG. 7r, the photoresist mask 239 is then removed, exposing the silicon dioxide layer 235 which was previously patterned with the hinge pattern 241. In accordance with the present invention, an ICP-RIE (inductively coupled plasma reactive ion etch) etch is applied in accordance with principles commonly known to those at ordinary skill in the art to which this invention pertains, as illustrated at 255, all the way through the silicon 200 to expose the silicon dioxide and silicon nitride portions defining the hinge 12 thereby forming the hinge 12. Since the etchant is much more selective for silicon than for silicon dioxide, the etching substantially stops when the silicon dioxide layer 215 is reached. Other suitable etchants, such as, for example, KOH, having similar selectivity can alternatively be used. Such an etchant with the desired selectivity is thus applied to a silicon (or other suitable material) wafer having a layer of silicon nitride (or other suitable material) so as to etch entirely through the wafer to expose and therefore form the oscillator hinge easily and inexpensively (without the need for expensive e-beam lithography) and precisely to the desired hinge thinness (which is the thinness of the layer 265 as applied) for the desired hinge compliancy.

Finally, with reference to FIG. 7s, in order that the hinge 12 may desirably be further softened (compliancy increased), the hinge pattern portion of the silicon dioxide layer 215, optionally, is selectively removed (i.e., without etching into the silicon nitride layer 265), as shown at 257, using 10-50% aqueous HF (hydrogen fluoride), more specifically described hereinafter, to further release the silicon nitride hinge 12. The silicon dioxide layer 235 is similarly removed to uncover the tip 18 (which until this step has been protected by the silicon dioxide layer 235). Since etch selectivity for silicon nitride over silicon dioxide increases with decreasing HF concentrations, we have used an aqueous mixture of 20% HF in 40% ethanol and 40% water, the ethanol being added to the mixture to reduce surface tension. At this concentration of HF, the selectivity of silicon dioxide to silicon nitride is on the order of 100 to 1, and the silicon dioxide layer is etched in seconds while the silicon nitride layer is stable for minutes, whereby to prevent etching of the silicon nitride while the silicon dioxide is being etched. Although the hinge is desirably further softened thereby, the removal of the silicon dioxide layer 235 is not required.

Although the 5 micrometer thick silicon pad or cantilevered member 16 may be considered to be reasonably reflective, it still only has a reflectivity of about 30% to the red light typical of lasers in AFM. To increase the reflectivity of the silicon pad to on the order of 90%, a metal layer 261 (for example, about 50 nanometers thick layer of gold, or other suitable metal such as aluminum) is preferably deposited thereon. When the sensor has symmetric torsion bars 76, it has been found to be immune to the thermal bimorph effect which warps asymmetric cantilevers with gold coatings. Other metals may of course be deposited as suitable, such as, for example, cobalt to produce magnetically sensitive levers for MAC (magnetic-AC) AFM, as discussed in W. Han et al, "A Magnetically Driven Oscillating Probe Microscope for Operation in Liquids," *Applied Physics letters*, vol. 69, 1996, pp 4111-4113. The sensor or oscillator 10 may then be calibrated using principles commonly known to those of ordinary skill in the art to which this invention pertains.

The handle chip edge 25, which is still attached to the wafer 27, is suitably pre-etched, using principles commonly known to those of ordinary skill in the art to which this invention pertains, to allow the handle chip 14, after it has been formed, to be easily removed (by controlled breaking along the pre-etched line 25) from the wafer 27.

While the fabrication process has been discussed with reference to AFM sensor construction and with respect to sensor 10 in FIG. 1, it should be understood that it is also applicable to other designs of sensors including those described herein having torsion bars such as shown in FIGS. 3, 4, 5, 6, and 10 and is also applicable for other applications such as, for example, multi-axis accelerometers, gyroscopes, movable mirrors, switches, magnetometers, and various other kinds of oscillators.

An alternative wafer 27 that may be used for making an oscillator in accordance with the present invention is what is known as the silicon-on-insulator wafer. Such a wafer has a thin layer of silicon dioxide sandwiched between two silicon layers of desired thickness. Such a wafer eliminates the need to monitor the etch-front during the KOH etch, since silicon dioxide may be used as the etch-stop layer for the KOH etch.

It should be noted that a second application Ser. No. 11/506,757 filed Aug. 18, 2006, (application publication 2007/0062265) has also been tiled by the inventors of the present application, the second application containing the same or substantially the same disclosure.

It should be understood that, while the present invention has been described in detail herein, the invention can be embodied otherwise without departing from the principles thereof, and such other embodiments are meant to come within the scope of the present invention as defined by the appended claims.

What is claimed is:

1. A device comprising an oscillator, a support structure, and a layer of material which is different from material of which said oscillator and said support structure are made, said layer of material including a pair of layer portions connected to said oscillator and said support structure respectively, and a pair of torsion bars defined by a pair of co-axial portions respectively of said layer of material which connect said pair of layer portions for torsionally suspending said oscillator, wherein each of said torsion bars is thinner than either of said oscillator or said support structure.

2. A device according to claim 1 wherein said support structure includes a pair of support members straddling said oscillator, and said co-axial portions interconnect said support members respectively with said oscillator.

3. A device according to claim 1 wherein said layer of material thickness is less than about 400 nanometers, and said oscillator and said support structure thicknesses are at least about 1 micron.

4. A device according to claim 1 wherein said oscillator is a probe for detecting a surface for sensing information about the surface.

5. A device according to claim 1 wherein said oscillator is a probe for detecting a surface to sense information about the surface, the device further comprising means for reflecting a signal off of said probe, a detector of the reflected signal, and means for deriving probe position information from the reflected signal.

6. A device according to claim 1 wherein the oscillator is a sensor adapted for use in an atomic force microscope.

7. A device according to claim 1 wherein said layer of material is silicon nitride and said oscillator and said support structure are made of silicon.

8. A device comprising an oscillator, a support structure, and a layer of material including a pair of layer portions connected to said oscillator and said support structure respectively, and a pair of torsion bars defined by a pair of co-axial portions respectively of said layer of material which connect said pair of layer portions for torsionally suspending said oscillator, wherein said layer of material is silicon nitride and said oscillator and said support structure are made of silicon.

9. A device according to claim 8 wherein said layer of material thickness is less than about 400 nanometers, and said oscillator and said support structure thicknesses are at least about 1 micron.

10. A device according to claim 8 wherein said support structure includes a pair of support members straddling said oscillator, and said co-axial portions interconnect said support members respectively with said oscillator.

11. A device according to claim 8 wherein said oscillator is a probe for detecting a surface for sensing information about the surface.

12. A device according to claim 8 wherein said oscillator is a probe for detecting a surface to sense information about the surface, the device further comprising means for reflecting a signal off of said probe, a detector of the reflected signal, and means for deriving probe position information from the reflected signal.

13. A device according to claim 8 wherein the oscillator is a sensor adapted for use in an atomic force microscope.

14. A device according to claim 8 wherein the device is made by (a) depositing on silicon a layer of silicon nitride; and (b) forming in the silicon said support structure and said oscillator, including applying an etchant which is selective for the silicon to etch all the way through the silicon and leave the silicon nitride substantially unetched to thereby form said torsion bars of the silicon nitride.

15. A device according to claim 14 further comprising a detector of movement of said oscillator.

16. A device comprising an oscillator, a support structure, and a layer of material which is different from material of which said oscillator and said support structure are made, said layer of material including a pair of layer portions connected to said oscillator and said support structure respectively, and a pair of torsion bars defined by a pair of co-axial portions respectively of said layer of material which connect said pair of layer portions for torsionally suspending said oscillator, wherein each of said torsion bars is thinner than either of said oscillator or said support structure, wherein the device is made by (a) depositing on a first material a layer of a second material; and (b) forming in the first material said support structure and said oscillator, including applying an etchant which is selective for the first material to etch all the way through the first material and leave the second material substantially unetched to thereby form said torsion bars of the second material.

17. A device according to claim 16 wherein the second material is silicon nitride and the first material is silicon.

18. A device according to claim 16 further comprising a detector of movement of said oscillator.

\* \* \* \* \*